US012718233B2

(12) United States Patent
Sado

(10) Patent No.: US 12,718,233 B2
(45) Date of Patent: Aug. 25, 2026

(54) SYSTEMS, APPARATUS, AND METHODS FOR TRANSFERRING DIGITAL ASSETS USING PROOF-OF-SOUND

(71) Applicant: Daniel J. Sado, Miami Beach, FL (US)

(72) Inventor: Daniel J. Sado, Miami Beach, FL (US)

( * ) Notice: Subject to any disclaimer, the term of this patent is extended or adjusted under 35 U.S.C. 154(b) by 442 days.

(21) Appl. No.: 18/059,894

(22) Filed: Nov. 29, 2022

(65) Prior Publication Data

US 2023/0169498 A1 Jun. 1, 2023

Related U.S. Application Data

(60) Provisional application No. 63/264,652, filed on Nov. 29, 2021.

(51) Int. Cl.

| | |
|---|---|
| ***G06Q 20/38*** | (2012.01) |
| ***G06F 3/16*** | (2006.01) |
| ***G06Q 20/36*** | (2012.01) |
| ***G06Q 30/0207*** | (2023.01) |
| ***G06Q 30/0251*** | (2023.01) |
| ***G10L 17/12*** | (2013.01) |

(52) U.S. Cl.

CPC ........... *G06Q 20/389* (2013.01); *G06F 3/165* (2013.01); *G06Q 20/36* (2013.01); *G06Q 30/0207* (2013.01); *G06Q 30/0261* (2013.01); *G10L 17/12* (2013.01)

(58) Field of Classification Search

CPC .. G06Q 20/389; G06Q 20/36; G06Q 30/0207; G06Q 30/0261; G06F 3/165

USPC ........................ 704/238; 381/56, 58, 92, 122

See application file for complete search history.

(56) References Cited

U.S. PATENT DOCUMENTS

| | | | | |
|---|---|---|---|---|
| 10,762,927 | B2 | 9/2020 | Yang et al. | |
| 11,120,075 | B2 | 9/2021 | Xu | |
| 11,132,169 | B2 | 9/2021 | Gruebele | |
| 2016/0066173 | A1* | 3/2016 | Glazer .................. | H04W 76/14 370/338 |
| 2017/0110130 | A1* | 4/2017 | Sharifi ................ | G10L 15/1815 |
| 2019/0340605 | A1 | 11/2019 | Lewis et al. | |
| 2020/0260147 | A1 | 8/2020 | Madisetti et al. | |
| 2022/0060471 | A1* | 2/2022 | Wilson .................. | H04W 12/65 |
| 2022/0337898 | A1* | 10/2022 | Dorogusker ....... | H04N 21/2187 |

FOREIGN PATENT DOCUMENTS

| | | | |
|---|---|---|---|
| WO | 2020114114 | A1 | 6/2020 |

OTHER PUBLICATIONS

Audfprint: Landmark-based audio fingerprinting, https://github.com/dpwe/audfprint, last changes May 22, 2019.

(Continued)

*Primary Examiner* — George C Monikang

(74) *Attorney, Agent, or Firm* — Wang Hardoon, P.C.

(57) ABSTRACT

Systems, apparatus, and methods for transferring digital assets using proof-of-sound. Content consumers may verify their presence at an event/drop using various mechanisms including audio recording, sensor data, data from other devices, and user interactions. Creators may reward content consumers who attend an event with rewards including non-fungible tokens (NFTs). Smart contracts may be deployed to a blockchain to mint NFTs for verified content consumers.

20 Claims, 8 Drawing Sheets

(56) References Cited

OTHER PUBLICATIONS

Chiru Labs, Inc., ERC721A Documentation, https://chiru-labs.github.io/ERC721A/#/, 2022.
Chromaprint, acoustid/chromaprint: C library for generating audio fingerprints used by AcoustID, https://github.com/acoustid/chromaprint; last retrieved Oct. 26, 2021.
Dalwon Jang, Chang D. Yoo, Sunil Lee, Sungwoong Kim, Ton Kalker. Pairwise Boosted Audio Fingerprint, IEEE Transactions on Information Forensics and Security, Dec. 2009.
Douglas James Butner, cXc Music NFT Standard, https://github.com/currentxchange/Music-NFT-Standard, 2021.
Fabian Vogelsteller, Vitalik Buterin, "EIP-20: Token Standard," Ethereum Improvement Proposals, No. 20, Nov. 2015. [Online serial]. Available: https://eips.ethereum.org/EIPS/eip-20.
Frank Kurth, Meinard Muller. Efficient Index-Based Audio Matching, IEEE Transactions on Audio Speech and Language Processing, Mar. 2008.
SonoCoin Whitepaper, Published Aug. 2021.
William Entriken, Dieter Shirley, Jacob Evans, Nastassia Sachs, "EIP-721: Non-Fungible Token Standard," Ethereum Improvement Proposals, No. 721, Jan. 2018. [Online serial]. Available: https://eips.ethereum.org/EIPS/eip-721.
Witek Radomski, Andrew Cooke, Philippe Castonguay, James Therien, Eric Binet, Ronan Sandford, "EIP-1155: Multi Token Standard," Ethereum Improvement Proposals, No. 1155, Jun. 2018. [Online serial]. Available: https://eips.ethereum.org/EIPS/eip-1155.
Yan Ke, Derek Hoiem, Rahul Sukthankar. Computer Vision for Music Identification, IEEE Proceedings of Computer Vision and Pattern Recognition, Jun. 2005.

* cited by examiner

Figure 1:
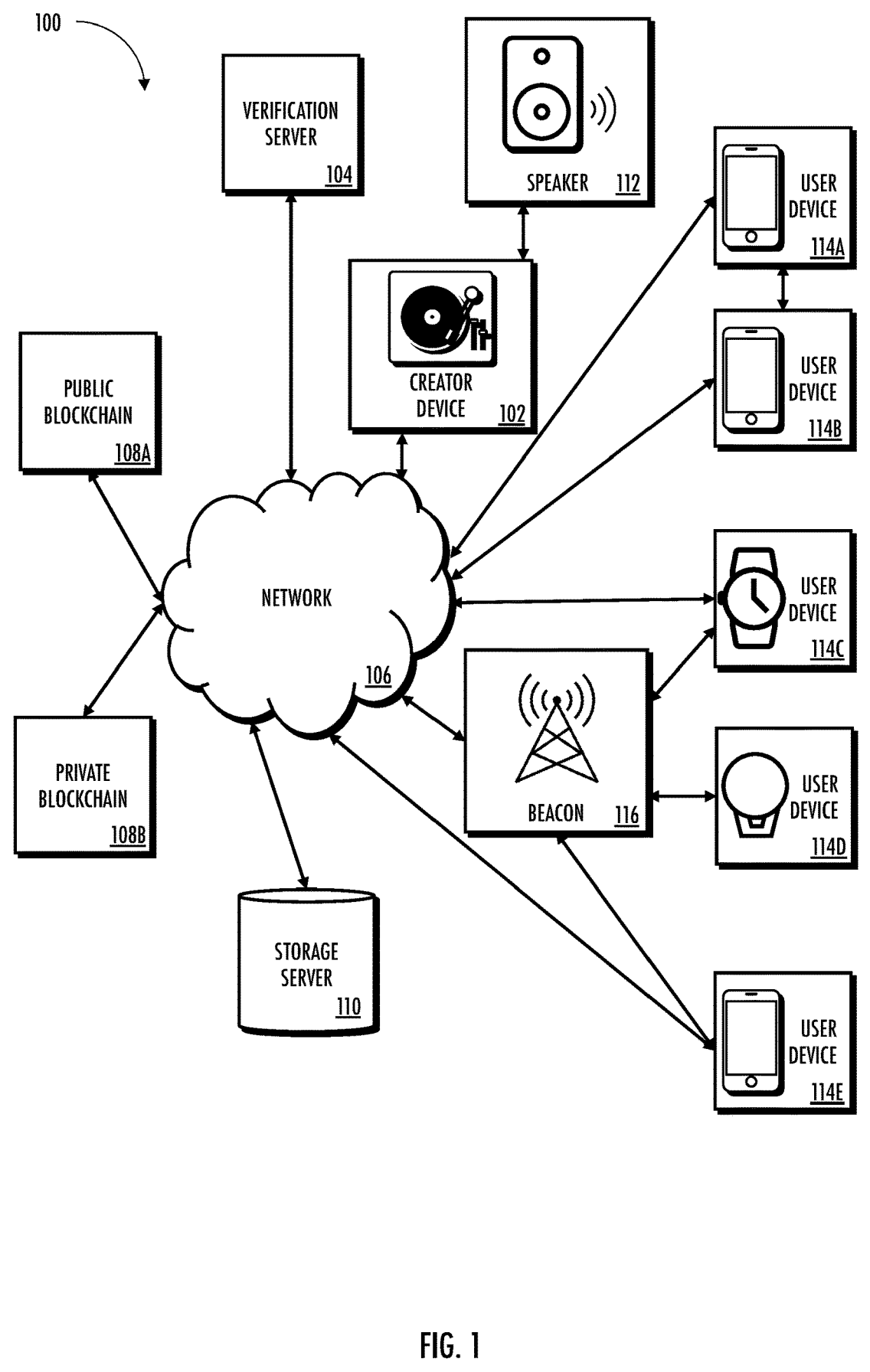

100

VERIFICATION SERVER 104

SPEAKER 112

USER DEVICE 114A

USER DEVICE 114B

CREATOR DEVICE 102

PUBLIC BLOCKCHAIN 108A

NETWORK 106

USER DEVICE 114C

BEACON 116

USER DEVICE 114D

PRIVATE BLOCKCHAIN 108B

STORAGE SERVER 110

USER DEVICE 114E

SYSTEMS, APPARATUS, AND METHODS FOR TRANSFERRING DIGITAL ASSETS USING PROOF-OF-SOUND

PRIORITY

This application claims the benefit of priority to U.S. Provisional Patent Application Ser. No. 63/264,652 filed Nov. 29, 2021 and entitled "SYSTEMS, APPARATUS, AND METHODS FOR TRANSFERRING DIGITAL ASSETS USING PROOF-OF-SOUND", the foregoing incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of digital assets. More particularly, the present disclosure relates to systems, computer programs, devices, and methods for transferring non-fungible tokens (NFTs) based on proof-of-sound.

BRIEF DESCRIPTION OF THE DRAWINGS

FIG. 1 is a logical block diagram of an exemplary system for creating and transferring digital assets according to aspects of the present disclosure.

FIG. 3 is a logical block diagram of a blockchain ledger and a network of nodes that use a distributed blockchain ledger, useful in explaining various aspects of the present disclosure.

DETAILED DESCRIPTION

Figure 2:
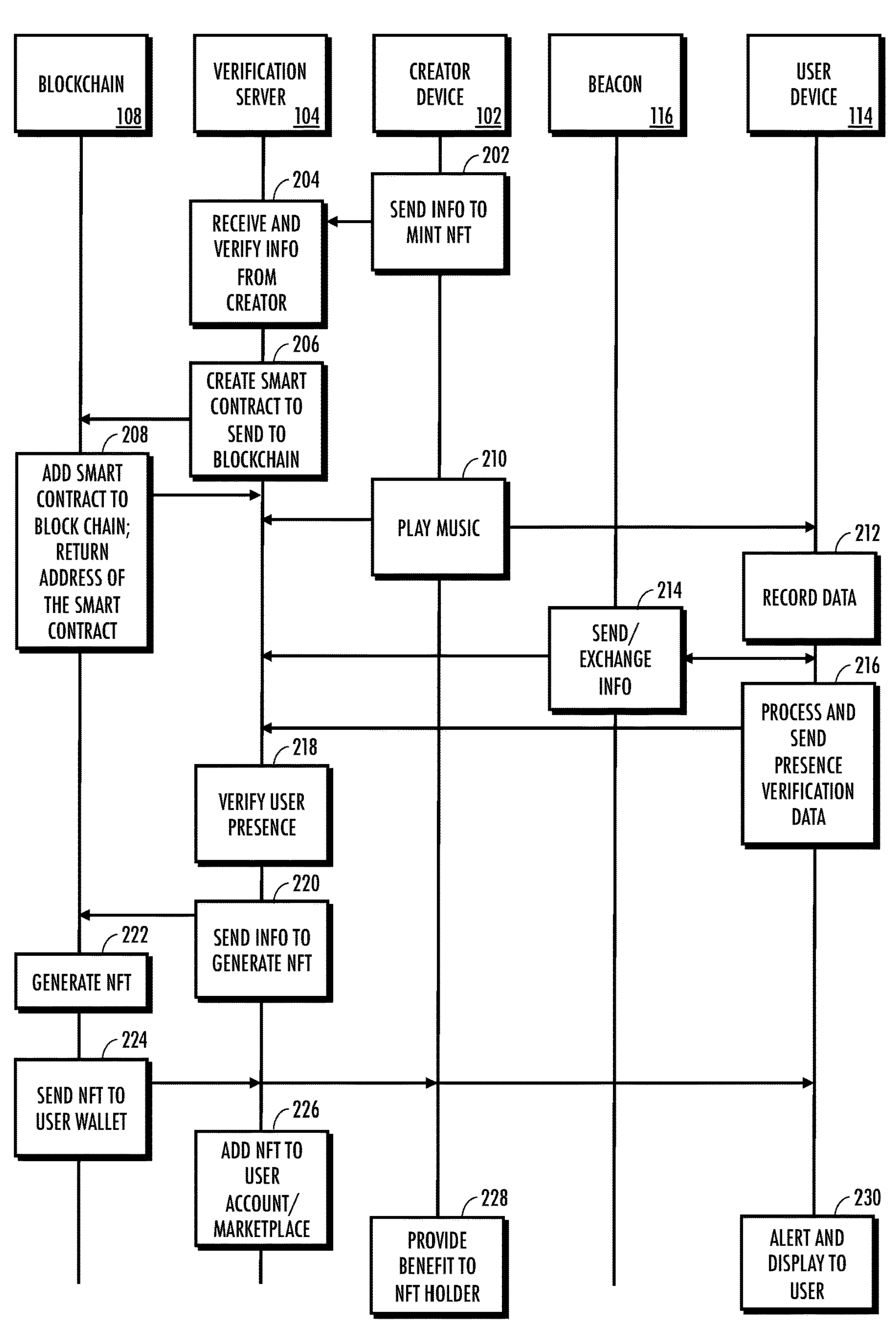
FIG. 2 is a ladder diagram illustrating interactions between devices of the exemplary system for creating and transferring digital assets according to aspects of the present disclosure.

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Operating Environment

Professional musicians and other performance artists are seeking new ways to interact with their audiences. Creating and maintaining authentic relationships with fans is often lucrative; fans are willing to pay price premiums for exclusive access and merchandise. Consider the following scenario: a musician would like to offer exclusive art for fans that attend a concert; the musician wants to ensure that only fans that actually attend the concert receive the art, that each fan only gets one (or their fair share), and that the art can't be copied or otherwise devalued. Unfortunately, existing techniques for providing such goods and services can be easily subverted through arbitrage and/or counterfeiting. Paper tickets can be hoarded and scalped, merchandise can be counterfeited, digital media can be easily replicated (often diluting its scarcity value). In other words, artists and audiences need new solutions for fostering their relationships.

The transiency and fluid nature of live performance is well-suited for presence verification applications. Each fan may generate a unique or quasi-unique set of verification data. In some embodiments, the verification data may include a proof-of-sound based on their channel characteristics that no one else shares. Other verification data may include location data (e.g., a GPS location), data from a verification beacon, sensor data (e.g., accelerometer/gyroscope data), and proximity data to other users (e.g., proof-of-bump data). Furthermore, audio fingerprint technologies (described below) can ensure that each proof-of-sound reflects a true recording experience. The unique and transient nature of audio also provides inherent difficulty for replay and/or counterfeiting attacks. To these ends, one exemplary embodiment of the present disclosure enables the creation of non-fungible tokens (NFTs) by a creator and transfer to their audience members, based upon smart contracts that are secured in a blockchain ledger verified by presence verification and/or using proof-of-sound. Non-blockchain based rewards may be provided a user e.g., a coupon/discount, certificate, digital download (e.g., a music file of a song).

While described with respect to an exemplary musician or performance artist, the present disclosure applies to other industries and products as well that can use presence or proof-of-sound verification including education, podcast and video applications, television, movies, radio, books/audiobooks, theater/dance, etc.

FIG. 1 is a logical block diagram of an exemplary system for creating and transferring digital assets according to aspects of the present disclosure. The system 100 may include a creator device 102 that interacts with a verification server 104, via a network 106. The verification server 104 may set up a smart contract and/or create digital assets on a block chain (e.g., public blockchain 108A or private blockchain 108B). Data regarding the digital assets may be stored on storage server 110. The creator device 102 may play a song/other content which gets transmitted via speaker 112. Users of user devices 114A-114E may verify their presence with the verification server 104 though capturing audio from the speaker 112 and interacting with a beacon 116. Upon verification, the digital asset may be created or transferred to user(s) via their user device 114A-114E.

FIG. 2 is a ladder diagram illustrating the interactions between devices of the exemplary system for creating and transferring digital assets according to aspects of the present disclosure.

In the illustrated scenario, a creator (such as a musician/disc jockey (DJ)) downloads a “creator application” onto their creator device 102. The creator device 102 may include a computer, smartphone, and/or their musical equipment (e.g., a turntable that runs a Virtual Studio Technology (VST) application within a Digital Audio Workspace (DAW)). Similarly, users can each download a “listener application” to their smart phone (e.g., user device 114A, 114B, and 114E), smart watch (e.g., user device 114C), smart key fob (e.g., user device 114D), or similar device. In some variants, the creator and/or listener application may be different modes of the same application software. As part of the application configuration process, both the creator and the users/listeners each create a digital wallet (or link an existing digital wallet) for accessing their digital assets. Additional user information may be collected to create an account associated with the creator or user. The user information may include an email address, a username, a password, industry, artist name, given/legal name, website address, biography, birth date, social media usernames/profile addresses, location, and/or payment details (including, e.g., bank account, credit card, cryptocurrency/digital wallet, or payment application details).

Prior to a live performance, the creator may use the creator application on the creator device 102 to setup a smart contract for the creation of one or more one or more non-fungible tokens (NFTs) to be minted later (after the live performance). In some variants, the NFTs are minted immediately and associated within their digital wallet. The time associated with the release of the NFT/release of data associated with an event/proof-of-sound may be called a “drop.”

Alternatively, the setup can be prior to (and a benefit associated with) other events or locations including e.g., a performance, a party, a fundraiser, a conference, a lecture, a live book reading, a store/gallery/event space opening, a specific date/time and location in a public area (e.g., a park or plaza), or an electronic location (e.g., a social media location, livestream, web conference, website, etc.). In some variants, the location may include multiple locations that must be verified prior to receiving a reward (e.g., visit a certain number of locations for a scavenger hunt, see/hear a certain number of artists perform, etc.). The date/time may also span a period of time (e.g., multiple hours, days, weeks, etc.) or be setup for an indefinite period.

To set up the reward or smart contract for a drop, the creator device 102 may send information to the verification server 104 (step 202). Alternatively, the creator device 102 may create a smart contract/NFTs directly on a blockchain 108. The information may include the name/profile information of the creator, the title of the work (or event), the date and time of the drop, location of the drop, the event type (e.g., performance, party, fundraiser, etc.), type of reward, etc. The reward may be provided on a blockchain in the form of a non-fungible token (NFT). In such cases, blockchain network information may be provided/selected. The blockchain networks may include any blockchain network that can support the creation of smart contracts/NFTs, e.g., Ethereum, Polygon, Klaytn, Solana, Arbitrum, Optimizism, Avalanche, Tezos, Flow, etc. Such information may include the network name, a remote call procedure (RCP) universal resource locator (URL) to connect to different networks, a chain identifier, a symbol, and a block explorer URL. Other reward information may include the number of rewards to offer/NFTs to create (i.e., number of mints), a price of the mint (in a currency/cryptocurrency).

Information about the reward may be provided/assigned. The type of reward may include a coupon for a discount, a ticket or access to an event, a sign-up for a service/newsletter, a digital asset (e.g., visual art, music), membership card, a physical product (e.g., t-shirt, poster, or other merchandise), etc. For example, the terms/amount of a discount, terms of access to an event, etc. Some rewards may be redeemable (and exchanged for another item). Some rewards may be static (i.e., the same for every verified user) while other rewards may be dynamic. Dynamic rewards may be randomly assigned or based on information about/provided by the verifying user. Such information may include previous interactions/verifications with the creator, preference information, other assets/products owned by the user, clothing size of the user, name of the user, etc. In some cases, the dynamic nature of the rewards may include varying a discount offered, a personalized note, varying whether a reward is offered at all or the size of the reward (e.g., in a contest with a certain number of grand prizes, first prizes, consolation prizes, etc.), size of a product (e.g., clothing size), more valuable prizes for more committed (more interactions)/longer lasting (time since first interaction)/new fans (first interaction).

In some variants, elements/traits of a minted NFT may be varied across a drop. For example, a visual art based NFT may include a number of definable traits including for example color, background, characters, clothing options, etc. Audio files may include different audio traits including styles of music, varying instruments, parts of an audio file, varying vocals or lyrics, etc. An audio NFT may mix and match these elemental traits like visual art. In certain examples, certain traits may be rarer than others (less likely to be selected for random generation). These traits may be used to generate the NFTs manually or via a generative computer script that pulls from a pool of different media and assembles them to compose the NFT.

Certain user verification parameters may also be provided at drop/smart contract/NFT setup. These parameters may include specific parameters a user must follow to verify their presence and/or consumption of the content by the verification server 104 after the drop. One such parameter is a minimum verification time. For example, a user may need to verify that they consumed at least a predetermined portion/threshold of the content (e.g., a specified period of time, a specified percentage of time, or remained at an event for a minimum period, etc.). Such verification may include recording (via the listener application on the user device 114A-E) the audio/video for at least the specified period as part of presence verification/proof-of-sound verification or otherwise indicate a continued presence in the specified location for a period of time, e.g., via periodic (e.g., every specified number of minutes/hours) or continuous check-ins. These check-ins may include capturing audio, interactions with other user devices 114A-E, beacons 116, etc. For example, presence verification techniques may be used to take attendance in a classroom. In such a system, there may be multiple check-in points for verification. For example, a user (a student) may need to verify their presence periodically or at the beginning and ending, of a class. In another example, a reward may be offered for listening to a song a certain number of times requiring a user to verify that number of plays of the song (on a particular service, hearing the song live, etc.) to receive the reward.

In one embodiment, the audio or visual work may be uploaded for verification. The upload may occur at (or prior to) the creation of the smart contract/creation of the drop or at the time of the drop. Upload at the time of the drop may include uploading live event audio/video from the creator (e.g., creator device 102), venue, or a user (e.g., user device 114A-E).

When an audio/video file is uploaded, the file is scanned for uniqueness or copyright infringement from other owners/creators (e.g., at the setup of the drop/event or during the drop). In some embodiments, the scanning occurs before the creator device 102 completes setup of the drop and before the verification server 104 can publishes the drop to user devices 114. In other embodiments, scanning of the media occurs when the media is uploaded as part of the drop prior to or concurrent with user verification. Verification server 104 may verify the creator has rights to the uploaded content prior to allowing the creator device to publish the drop. If, during a scan, the verification server determines that the upload matches content in a database of already published material, the creator device 102 may be required to verify their identity or rights to the content if the creator was not previously verified. Content matching may include fingerprinting the file and comparing the fingerprint with fingerprints or partial fingerprints in a content database. Content in the content database may be added by creators/creator devices 102 or obtained from rightsholders. In some examples, when a match is found the rightsholder is alerted to potential infringement. In other examples, where the creator may have used (e.g., remixed) content as part of their work, the creator may be requested to pay a license fee to use the as part of their work and upon payment the creator will have rights to use the identified content in their work.

Additionally, payment may be made from a creator via the creator device 102 to the verification server 104. Payment may be via a bank/application transfer of flat currency (e.g., US dollars) or crypto-currency (e.g., ETH on the Ethereum blockchain) to pay for mining costs (so-called "gas" on the Ethereum blockchain) associated with deploying the smart contract/creation of the NFTs.

The verification server 104 may receive the information to create the reward/smart contract from the creator device 102 (step 204). The verification server 104 may include a single server or software that runs on a server/cloud network. In other embodiments, the verification server 104 may include a peer-to-peer network of verifying nodes. The verifying nodes may be associated with the creator/creator device 102 rather than a centralized verification server. The verification server 104 may verify the information provided by the creator device 102 to be accurate (e.g., that parameters selected are compatible with the method of verification, the reward, the event/content type, the blockchain network, etc.). Payment details may also be verified to create smart contract/NFTs, e.g., to add the smart contract to the blockchain and/or to transfer NFTs to a user.

NFTs with varying traits may be generated by the verification server 104 (or received directly from the creator/creator device 102). For example, in the context of an image-based NFT asset, image files with individual trait variations of each trait may be created and stored. The verification server 104 may run a script that receives the number of NFTs to generate, a listing of traits (and their rarity), and the locations of images of the sub-traits. The script may generate the indicated number of images with the traits (weighted according to indicated trait rarity) by combining (e.g., stacking) the individual trait images to form a final NFT asset. Similarly, different audio may be combined (stitched together and/or blended) with various traits to generate a final NFT asset. In some embodiments, duplicate final images/audio may be removed (and/or re-generated) so every NFT is unique. The NFT assets may be uploaded to network-accessible storage (e.g., on storage server 110) and the metadata of the NFT asset (e.g., storage location, traits in the NFT asset, etc.) stored for use in minting the NFTs. The metadata of the NFTs may be stored in a single file or multiple files. In one example, the metadata for generated NFTs is stored in a structured file format, e.g., JSON formatted file and may be stored on network-accessible storage (e.g., storage server 110). The address of the metadata may be associated with a created token on the smart contract (via, e.g., in a tokenURI field). In some embodiments, the structured JSON format complies with one or more blockchain standards for structuring metadata, e.g., ERC-721 and ERC-1155 on the Ethereum blockchain. Some data structure standards are NFT content specific, e.g., a standard for structuring music NFTs may be accessed at https://github.com/currentxchange/Music-NFT-Standard and is, incorporated by reference in its entirety.

Figure 3:
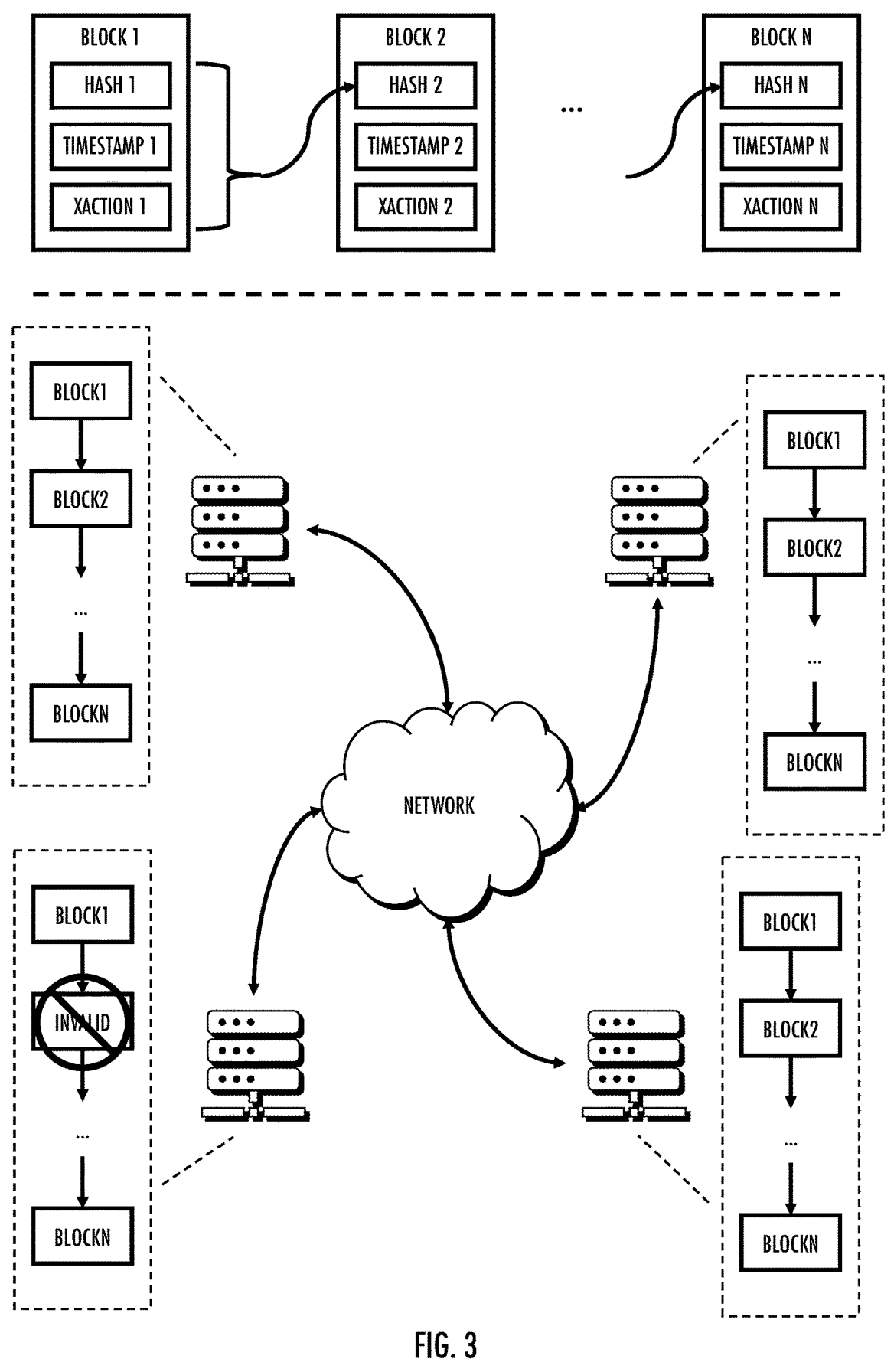

Distributed Ledger Technology, Blockchain Ledgers, Smart Contracts, and Non-Fungible Tokens FIG. 3 is a logical block diagram of a blockchain ledger, and a network of nodes that use a distributed blockchain ledger, useful in explaining various aspects of the present disclosure.

A blockchain is a list of records ("blocks") that are linked together ("chained") with cryptographic hashes. In one specific implementation, each block contains a cryptographic hash of the previous block, a timestamp, and transaction data. The cryptographic hash is a mathematical algorithm that maps data to a range of hash values; the cryptographic hash is a one-way function i.e., a "message" deterministically maps to only one hash value, and the original message cannot be determined from its hash value. Hashes may have additional desirable properties such as e.g., ease of computation, uniqueness of the hash (e.g., likelihood of messages with the same hash), and/or obfuscation (small changes to the message result in large uncorrelated changes in hash value).

The timestamp and transaction data memorialize a digital transaction. For example, the transaction data may identify two (or more) parties to a digital transaction, a digital asset that was transferred/will be transferred, and/or the transaction time. The timestamp records the time of block publication (which may be different from the transaction time). Other examples of digital transactions may include so-called "smart contracts" (also referred to as "smart K"); smart contracts are software programs that provide contract-like behavior that are partially or fully executed and enforced with machine automation (without human intervention). Smart contracts are often used to avoid trustees/intermediaries and their corresponding frictional costs (e.g., escrow fees, settlement time, etc.). Since the timestamp, transaction data, and previous block's hash value are hashed together, the timestamp proves that the transaction data and previous hash value was present at the block's publication. Smart contracts may not constitute legal agreements; nonetheless, the enforcement mechanism is automated and so external legal enforcement is unnecessary (and, in some cases, impossible).

In distributed ledger applications, blockchain data structures may be used to communicate and validate data transactions without centralized management. As shown in FIG. 3, each node within the network of nodes locally stores a blockchain ledger ("the distributed ledger"). Each node of the network independently audits new transactions; additionally, auditing new transactions is computationally much easier and faster than altering a previous block (and calculating all the resulting downstream changes to hash values). In other words, unlike centralized control, a distributed ledger allows a network of nodes to decentralize governance; no single node controls the distributed ledger, instead the distributed ledger is managed through consensus.

Consider a malicious node that attempts to change the blockchain ledger by substituting a counterfeit ledger that changes an earlier transaction. The other nodes each independently have a local version of the blockchain ledger which has their record of data transactions; since each node votes in its own self-interest (i.e., it seeks to preserve its version of events), the malicious node's record is quickly discovered. Depending on the network security model, the malicious node may be kicked or otherwise punished. In other words, the collective self-interest of the nodes ensures that no single node (or a minority of nodes working together) can alter the blockchain ledger.

While consensus-based governance protects against a single point-of-attack (and robustly avoids single point-of-failure), it may be susceptible to other types of network attacks that dilute legitimate network participation. For example, a so-called "Sybil" attack occurs where an attacker floods a network with many pseudonym identities (i.e., distinct identities that the attacker controls). Within the context of a majority vote consensus scheme, an attacker may spawn enough pseudonyms to control the majority of the network's nodes and change the distributed ledger at will (this attack is also commonly referred to as a "51% attack"). Other consensus schemes may be susceptible to similar attack methodologies, the foregoing being purely illustrative.

Existing blockchain implementations use "proofs" to defend against Sybil attacks. In most implementations, suitable proof is zero-knowledge i.e., no information other than the proof itself is required for verification by other nodes. So-called "proof-of-work" allows one node (the prover) to show others (the verifiers) that a certain amount of computational effort (work) has been expended. As but another example, so-called "proof-of-stake" allows one node (the prover) to show others (the verifiers) that a certain amount of the voting tokens are possessed (the stake). Other examples of proof include e.g., proof-of-space (an amount of memory), proof-of-authority (an authorized node), proof-of-personhood (a human).

Conceptually, proofs introduce conservation laws into the digital domain. For example, proof-of-work ensures that computational effort is conserved; the proof cannot be multiplied simply by copying the data structure. Similarly, a proof-of-stake ensures that a percentage of stake is owned (and conserved). More directly, existing schemes impose some form of cost on network activity to ensure that attackers cannot dilute legitimate network participation.

While blockchain technologies were first described in decentralized (public) contexts (e.g., public blockchain 108A), the technology is not so limited. The blockchain technology has been extended to centralized (private) implementations (e.g., private blockchain 108B); in many cases, centralized blockchains may be used to e.g., vest control within a few (trusted) entities, reduce single points of failure, reduce transaction costs, provide faster transaction times, etc. For example, a centralized blockchain is generally much more difficult to successfully attack using pseudonyms. Various other implementations may modify and/or hybridize aspects of blockchain operation to change centralized/decentralized governance. One example of a blockchain network that hybridizes centralized/decentralized governance is the LTO network.

Normally, digital data structures are "fungible" i.e., a digital photograph and its copy are identical and could be mutually interchanged—there is no "original" or "official" version of the digital data structure. However, each NFT has a unique identity and chain-of-title which is memorialized within a blockchain ledger. Typically, NFTs are associated with an underlying digital or physical asset to track possessory interest; while copies of the asset associated with the NFT are unrestricted and could be shared like any other file, the NFT itself is a unique token. NFTs have broad applicability to primary and secondary markets for collectibles and merchandise. Users may store, interact, and transfer NFTs using their digital wallets. Standards have developed on various blockchains for the creation of NFTs and smart contracts that mint the NFTs. For example, on the Ethereum blockchain, standards such as the ERC-20, ERC-721, ERC-721A, and ERC-1155 standards implement various standard interfaces for smart contracts/NFTs. Implementation details of the ERC-20, ERC-721, ERC-721A, and ERC-1155 standards may be accessed at https://eips.ethereum.org/EIPS/eip-20, https://eips.ethereum.org/EIPS/eip-721, https://chiru-labs.github.io/ERC721A/#/, and https://eips.ethereum.org/EIPS/eip-1155; each of which is incorporated by reference in their entirety.

NFT storage may include one or more of any accessible location including on the blockchain itself (e.g., as a node of public blockchain 108A and/or private blockchain 108B) or on a network-accessible storage server. Using a public blockchain 108A to store NFT assets or media (such as an image or audio file) may be quite expensive. As a practical matter, public blockchain storage may be suitable for smaller file structures. For example, NFT assets (e.g., a custom image/audio file, reward certificate, etc.) may be stored off the blockchain on a separate storage server(s) with an address of the NFT asset stored, directly or indirectly, on the blockchain. In some alternative implementations, private blockchains 108B could be customized to provide custom blocks for storage of NFT assets.

The address of the NFT asset may be on one or more network-accessible storage solutions (e.g., storage server 110). Addressing of NFT assets/files on the network-accessible storage may include traditional hypertext transport protocol (HTTP) addressing or a content addressing protocol, such as, InterPlanetary File System (IPFS). Content addressing is a system where the address of a file on a server includes data based on the content itself, e.g., a hash/fingerprint of the content. Such an addressing scheme can ensure the integrity of files that may be susceptible to file replacement (using a traditional file addressing scheme/protocol) as well as "link rot" (breaking of unmaintained hyperlinks over time.)

As used herein, the term "digital wallet" or "e-wallet" refers to a device, service, and/or software that enables one party to store digital goods/tokens and make electronic transactions with other parties. A digital wallet is an application (software or hardware) that allows a user to interact with a blockchain network. Using a digital wallet, a user may view an account balance on a blockchain ledger, send transactions to the blockchain (to send cryptocurrency, NFTs, deploy a smart contract), or interact with decentralized applications (dApps). In some examples, a digital wallet stores a private key of a user for use in signing digital transactions to perform transactions on the blockchain. There are various types of digital wallets. One such type are physical hardware wallets to store access information about digital assets (e.g., cryptocurrency and NFTs) without being network connected (so-called "cold" wallets). Other digital wallets (so-called "hot" wallets) are applications that may be run on various devices (e.g., creator device 102/user devices 114) natively, as applications running on the platform, or on a server connectable via a browser. Digital-asset exchanges and services that interact with the blockchain may create a digital wallet for a user or connect directly to a digital wallet controlled by a user for storage of digital assets which may be secured using a user's login credentials (e.g., a username and password). Other wallets are secured with complex password or a seed phrase to access the digital wallet.

Referring back to FIGS. 1 and 2, the verification server 104 may, using the received information from the creator device 102, create the smart contract and send/deploy the smart contract for inclusion on the blockchain 108 (step 206). Sending the smart contract to the blockchain 108 may include sending the smart contract to one or more (mining) nodes associated with the particular blockchain. Creating the smart contract may include inserting information received from the creator device 102 into the smart contract or a smart contract template. The smart contract may be compiled by verification server 104 into bytecode for inclusion in a blockchain transaction. The transaction may be digitally signed by the verification server 104. Alternatively, the transaction may be signed by the creator device 102 and/or the digital wallet associated with the creator. The verification server 104 may deploy the transaction including the smart contract on the blockchain 108. Deployment may include sending the compiled contract code (e.g., bytecode) as part of a blockchain transaction to nodes of the blockchain 108. The NFT assets may be uploaded by the verification server 104, for storage, to storage server 110. The verification server 104 may wait to receive a confirmation address of the smart contract that has been deployed on the blockchain 108. The confirmation address may be used later by the verification server 104 to interact with the contract and generate (and transfer) NFTs to users following verification.

In some alternative embodiments, the verification server 104 deploys a master smart contract to the blockchain 108 that can mint multiple types of NFTs for various creators. Upon receiving information from the creator device 102, the verification server 104 may interact with the master contract that is on the blockchain 108 to create NFTs associated with a particular drop for a particular creator (e.g., the creator associated with the creator device 102).

In further alternative embodiments, the verification server 104 may mint the NFTs directly on the blockchain without the use of a smart contract by deploying the NFTs directly onto the blockchain.

One or more (mining/validating) nodes of the blockchain 108 may add the smart contract transaction (received from the verification server 104) into a proposed block for the next block of the blockchain 108 (step 208). The node(s) may propagate the proposed block to the rest of the network. The proposed block may include other (unrelated) transactions and the hash of a previous block. Selection of the next block of the network may be based on the commitment/consensus process of the blockchain 108 (typically using one or more "proofs," described above). Once a block and its transactions are committed to an address on the blockchain 108, the address of the block/transaction for the smart contract may be sent to the verification server 104. This address allows the verification server 104 and/or other users to interact with the smart contract.

After receiving the address of the smart contract or confirmation of the inclusion of the smart contract on the blockchain 108, the verification server 104 may notify or alert the creator device 102 that the NFTs are ready to be minted, according to the indicated event/drop specified by the creator/creator device 102.

Referring now to the listener application, the listener application (e.g., on user device(s) 114A-E) may allow a user to create a profile and associate/join communities associated with one or more creator(s) (a musician, artist, author, lecturer, etc.), interest category (genre of music, type of lecture/art), location (a city, state), or venue (e.g., location space, a park). The listener application may also act as a digital wallet and store rewards (e.g., NFTs, coupons, etc.) associated with the user.

The user may search or explore drops in their area and/or from creators they follow or have interacted with in the past (via the listener application on the user device 114A-E). The user device 114 may send location data (via e.g., user input or from a GPS sensor) to the verification server 104. The verification server 104 may send a list of events, drops, and/or rewards with a pre-set or specified distance from the user/user device 114A-E based on the user location data (in their profile or input) or from creators followed by the user and the time of the drop/event.

The user device 114 may alert the user when they are current inside or have entered the location of a drop. For example, a notification may be sent to the user device 114. This may include entering a geofenced area or an area within transmission distance of one or more beacons 116 or by the user device 114 recording audio in a particular location. A dynamic reward may be created for users who enter a particular location. For example, the user device 114 may receive a reward (e.g., a coupon) for a clothing store or a section of the clothing store while browsing or walking by a store or section of the store based on a data exchange with a beacon device 116 or recording ambient audio/steganographic transmissions in the location. The reward may be sent to the user device 114 passively, without the user actively engaging with the user device 114.

At the event/drop, the creator/the creator device 102 may perform a triggering action that a user can use to verify their presence to obtain a reward (step 210). For example, a musician may play a particular song (or part of a song) as the triggering action (via, e.g., speaker 112). In some examples, a triggering action may include playback of steganographic data (described below) hidden in the music that is imperceptible by human listeners. Such steganographic data may trigger recording on the listener device (upon hearing the hidden data). Alternatively, any part of a band's set may be played as the triggering action. For example, during the hook or chorus of a song, the creator could trigger the release of the NFT using a VST by pressing a button on the MIDI controller. Pressing the button on the MIDI controller can send an instruction to the verification server 104 (or nodes of the blockchain 108) to allow user verification or to begin minting NFTs. Additionally in some embodiments, the user may be alerted to record the audio by scanning a QR code that is displayed at the venue (at the time of the drop).

In some examples, the triggering action is hidden by the creator. In one example, a musician may hide a reward somewhere in their recorded song catalog. Any user may listen to the song or portion of the song while capturing audio to verify their listening. Once verified, the user receives the hidden reward. In an alternative example, only the first user to verify listening receives the reward.

In other exemplary events/drops, no specific triggering action is needed but instead merely verifying a user's presence in a location within a particular window of time (for a particular period of time) can be used to receive the reward. In some embodiments, the drop/event is not a particular location or time period but instead an open drop where a user device 114 can verify that a user has listened to a set number of plays of a song/a collection of songs/a musician's library of works on one particular platform (e.g., live, at one or more bars, a streaming platform) or a set of platforms.

In one such example, during a live performance, the creator's creator application and the user's listener application both record/obtain audio data for the performance. For example, the creator application on the creator device 102 may obtain the digital audio waveforms that are generated by the VST. In some variants, the creator's version of the digital audio waveform (before being played over speakers) may be treated as a "clean" copy since it does not have any ambient noise. Audio and/or a fingerprint of the audio from the creator device 102 (or another device associated with the creator) may be sent to the verification server 104 for use in verification of user's presence. The verification server may send the audio and/or a fingerprint of the audio received from the creator device 102 to a node of the blockchain to memorialize the performance. The transaction may update the smart contract with information/metadata about the event (storing the fingerprint of the audio on the blockchain). The audio from creator device 102 may be stored off the blockchain with address metadata stored on the blockchain. The audio or the fingerprint may be associated with NFTs provided to verified users (as, e.g., metadata).

In some embodiments, in order to verify that a user is actually listening to music at the venue (and not just fraudulently replaying or streaming the music elsewhere), steganographic data may be imperceptibly blended within the audio signal. Steganographic verification may occur with other verification types (e.g., GPS location data, beacon 116 data, proof-of-bump, etc.). "Steganography" refers to cryptographic techniques for concealing a message within other data; steganographic techniques can be used to improve security through obscurity. For example, steganography can modulate time and/or location information over physical audio in a manner that is imperceptible to humans (e.g., the frequencies may be out-of-range, or may be so mildly different as to be ignored). Additionally, in some cases, the steganographic codes may be randomized or otherwise unique such that a replay would be detectable (e.g., the randomized steganographic code would not match the time stamp).

Concurrently, the user's listener application may record audio from the microphone of user device 114 (step 212). This recording may be used to verify the user's presence at the drop in order to receive a reward or benefit. A user may activate the audio recording by selecting a button in the listener application or scanning a QR code in the venue. Alternatively, audio recording may be continuously recorded while the application is active on the user device 114. In some examples of continuous recording, the listener application will listen for an audio tone, code, or steganographic data, in the recorded audio to keep recording, otherwise the data may be overwritten. In other examples, the listener application may record photos or videos using a camera on the user device 114. Additionally, the user device 114 may capture other sensor activity including GPS signals, accelerometer/gyroscope measurements, wireless (electromagnetic) signals from e.g., Wi-Fi, cellular, or Bluetooth antennae on the user device 114, etc. to use in verifying the user presence.

In one specific implementation, an audio (or acoustic) fingerprint may be generated from the audio signal; each fingerprint numerically represents identifying characteristics of the audio signal. Additionally, in some cases the fingerprint may also quantify channel specific effects which are unique to the user's listening experience (e.g., echoes, muffling, ambient noise, etc.). Typically, fingerprint algorithms are based on the perceptual characteristics of the audio signal; the human ear perceives e.g., frequency, frequency distribution, and/or phase differently than a machine would. For example, the human ear is unable to identify differences in phase. Similarly, minor variations in frequency may be ignored; however even minor differences in frequency distribution may be detected. In other words, fingerprint algorithms are usually designed such that audio files that would be perceived similarly would have similar fingerprints, even if their waveforms may be quite different. Audio fingerprints algorithms provide some robustness against differences in sampling (upsampled/downsampled/resampled), filtering, equalization, compression, ambient noise, echoes, etc. Published fingerprinting algorithms include Chromaprint (see https://github.com/acoustid/chromaprint, last retrieved Oct. 26, 2021) which is based on Yan Ke, Derek Hoiem, Rahul Sukthankar. Computer Vision for Music Identification, Proceedings of Computer Vision and Pattern Recognition, 2005; Frank Kurth, Meinard Müller. Efficient Index-Based Audio Matching, 2008; and Dalwon Jang, Chang D. Yoo, Sunil Lee, Sungwoong Kim, Ton Kalker. Pairwise Boosted Audio Fingerprint, 2009; and audfprint (see https://github.com/dpwe/audfprint, last retrieved Oct. 26, 2021), incorporated by reference in its entirety.

In some implementations, audio fingerprints may be validated before they may be used for verification. In some variants, preliminary checks are performed to ensure that the audio fingerprint meets the minimum requirements for presence verification. For example, verification may entail checking that the captured sound is of sufficient quality and duration to provide a meaningful fingerprint. Preliminary checks may prevent incomplete fingerprints from creating unnecessary congestion and/or processing burden. Other types of verification may focus on the transitory nature of audio; for example, audio fingerprints for a live performance would only differ in capture time by a small amount (due to propagation delay and/or device timing differences). Audio fingerprints outside of the performance window is likely to be a malicious attack and can be safely discarded. Still other types of verification may focus on the physical uniqueness of the listening experience; while the primary characteristics (e.g., the melody, bass line, etc.) of a fingerprint should match other fingerprints, secondary channel characteristics (e.g., echos, ambient noise) are unique to each observer's physical time and place. Fingerprints that only trivially differ (or do not differ) in channel characteristics may be flagged as replay attacks.

For example, audio provided by a creator device may be the digital file as played, or alternatively, recorded from the vantage point of the creator; in contrast, an audience member may provide proof-of-sound (recorded) based on a microphone recording that also captures nearby chatter and/or ambient noise. As a practical matter, the proof-of-sound (played) and proof-of-sound (recorded) may be very different; however, they need not be identical, merely sufficiently similar to prove that the acts of playing and recording actually occurred. In some cases, uniqueness of each proof-of-sound may additionally provide security benefits that prevent replay attacks/counterfeiting. Other techniques to secure against replay attacks may include proof-of-bump/user interaction history verification/GPS location submissions, and verifying by streaming/recording live (as opposed to delayed) compared with other nearby user submissions.

Depending on the application and/or usage, different levels of similarity, accuracy, and/or authentication may be used. For example, proof-of-sound that is generated in ambient noise may reduce the accuracy requirements, require cross-verification (e.g., temporal proximity to other proof-of-sound and/or other sensory modalities such as accelerometer/gyroscope, etc.), or be otherwise qualified in precision/accuracy. Similarly, proof-of-sound that is generated in low (or zero) noise environments may be held to a higher accuracy. For example, audio captured in a quiet concert hall during a classical music performance may have higher fidelity compared to a DJ performance at a crowded bar. For example, audio received via a digital audio input may be treated with zero error.

While the foregoing discussion is presented in the context of audio fingerprints, analogous techniques may be used for other device sensor measurements. For example, accelerometer/gyroscope measurements may be fingerprinted. Similarly, video and/or visual recordings can be fingerprinted using pictures or video captured by the user device 114.

In some cases, wireless signals may also be captured and fingerprinted (step 214); for example, nearby Bluetooth and/or Wi-Fi beacons can be captured—each beacon 116 may be identified by its own unique code (e.g., SSID, Bluetooth Low Energy (BLE) beacons, etc.), signal strength, timestamp, etc. In some examples, the beacon 116 may send its broadcast data to verification server 104 to indicate the unique data that may aid in presence verification of a user. In other examples, the listener application on the user device 114 may send data to or exchange data with the beacon 116. The beacon 116 may provide user details to the verification server 104 or may digitally sign information (e.g., a user identifier) of the user and other data (e.g., a timestamp, event identifier, etc.) and provide that signed data to the user for later use in verification with the verification server 104.

Steganographic data may also be used to compensate for limited network connectivity. For example, wireless kiosks are often distributed throughout a concert venue to relay traffic and improve overall network connectivity. Additionally, however, the beacon 116 may generate continuous authentication codes which are transmitted as steganographic audio codes; the superposition properties of audio waveforms will allow the recording device to capture both the music and the steganographic information. Authentication codes and other data broadcast by the beacon 116 may be encrypted. The data may be decrypted by, e.g., user device 114 or verification server 104 (and not, e.g., the user device 114). In this manner, the presence of the user may be verified at a later time (through the superposition of the recorded audio and steganographic codes proves concurrent recording at a time and place).

The beacon 116 may provide verification for a user directly. In one example, a smart key fob (e.g., user device 114D) may send user data to the beacon 116 to verify the presence of the user. For example, where the smart key fob does not have a network connection on its own, the smart key fob (or other user device 114) may rely on sending data to the beacon 116. Data may be transferred via a shortwave connection/messaging (e.g., near field-communication (NFC)/Radio Frequency Identification (RFID); Bluetooth Low Energy; ultra-wideband signals). The beacon 116 may send/relay this data to the verification server 104 to verify the presence of the user at the drop/event. In such instances, the user may not need to separately verify their presence or request the reward with the verification server 104.

The beacon 116 may provide other data to the verification server 104. Such statistics may include statistics about how many user devices 114 pass a specific location per hour/time frame, how long the average user or a particular user waits in line, how many rewards were triggered from that beacon 116 per hour/time frame, what songs were used to trigger a reward in a specific area. The verification server 104 may provide such statistics to the creator, the venue hosting the event, or as further data for user verification.

In some examples, users/user devices 114 may verify other users/user devices 114. In one implementation, user devices may detect the proximity of other user devices based on Bluetooth, NFC, or other wireless technology. Each user device may generate records of encounters with others at times/places (i.e., a history of "who was bumped into"). This can provide a presence verification means for e.g., a proof-of-bump. For example, a first individual with the user device 114A "bumps" into another individual with a user device 114B; each individual (with user device 114 A and 114B) has an independent record of their bump (device ID, time, location) that is secured within both devices. The bump record may be signed by one or both devices.

In some examples, user interactions at an event/drop may be sent as part of the data recorded, processed, and sent to the verification server 104 by the user device 114A and/or 114B. This interaction/"bump" data may be used to verify the presence of both devices (user device 114A and 114B) at the same location at a particular time. To combat fraudulent interactions, user devices 114A-E and user accounts may be given a rating based on the number or quality of previous interactions with the verification server 104, other user devices 114A-E, the creator, etc. which may modify the weight that a particular interaction offers a user. For example, a newly registered device may have a minimal or low rating that provides minimal assurance to the verification server 104 as to the claimed interactions of the new device. In contrast, a known device (previously registered)

that has many previous interactions may have a higher rating and thus their interaction may have a higher weight for presence verification.

In some examples, entire or partial interaction/bump histories may be shared between users (at, e.g., the time of the bump). User interaction histories may then be sent to verification server 104 to verify users not involved with the interaction. In one example, by propagating fingerprint history of previous bumps at each new bump, the interactions of various users (even users who did not directly interact/bump) will propagate making verification easier as it is unlikely that disparate users will coordinate to spoof interactions. For example, in order to falsify a bump, the fingerprints for both of the user devices (primary bumps), everyone the primary devices have bumped into (secondary bumps), everyone that the secondary devices have bumped into (tertiary bumps), etc. must also be modified. In other words, proof-of-bump can quickly distribute an audit of bump history that is exponentially difficult to falsify. Subsequent verification may be performed by checking that every individual's collected fingerprints are consistent with all other bump histories. Notably, each device can verify portions of the bump history of their peers privately using their internal fingerprint records (i.e., without exposing their own bump history).

More generally, any captured data/sensor data may be processed to prove capture/observation. In other words, these different techniques may be broadly extended to any proof of physical environment (proof-of-visual-performance, proof-of-dance, proof-of-bump, etc. described in greater detail below). Additionally, it is appreciated that different modalities of fingerprints may be used to discern between different parties; for example, users/user devices 114 that are standing next to one another may record substantially the same audio fingerprints, but they may have different physical motion (dance). When taken as a collective, each user may have a unique combination of different proofs.

User devices 114 may process and send verification data to the verification server 104 (step 216). In some examples, sending the verification data is performed immediately upon capture and processing; alternatively, sending the verification data may be performed at the end of the set period of time for the event. In the event the user device 114 is unable to send the verification data to the verification server 104, the verification data may be cached on the user device 114 until a connection is re-established. Upon re-establishment of the connection, the user device 114 may send the data to the verification server 104.

The verification data includes or is based on recorded data (e.g., audio/video recordings), location data (e.g. GPS sensor data), movement data (e.g., accelerometer/gyroscope data), and interaction data with beacons 116 and other user devices 114A-E. The data may be processed by the user device 114 before sending to the verification server 104. In some examples, processing may include fingerprinting or digitally signing some or all of the verification/sensor data. Data measurements and captures may be time or location stamped. Processing may also include modifying captured media data (audio/video/images) by cutting/clipping/cropping/encoding sections of an audio/video/image file including a section of interest. In some examples, verification data may be anonymized to remove certain personally identifiable data about the user/user device or other users/user devices at the event/drop. In some examples, processing the verification data may also include checking and/or confirming steganographic data in an audio capture; when absent, the user device 114 may stop further processing of verification data and not send the verification data to the verification server 104.

The user device 114 may submit (to the verification server 104) a request for the offered reward, or selected reward(s) (e.g., if multiple options were offered), for verification at the drop/event. In some cases, the user device 114 may also include other user input (e.g., a request/an acceptance to be added to the community of the creator, a mailing list of the creator, or other marketing by the creator).

The verification server 104 may receive the verification data from the user device 114, other user devices 114A-E, the creator device 102, beacons 116, etc. The verification server 104 may combine this received data with other information known about the user, the creator, the venue, and other users including history using the service, other events/drops created or attended, etc. The verification server 104 may use some or all of this data to verify the presence of the user/user device 114 (step 218).

In one example, the verification server 104 generates a confidence value for the verification of the user. The confidence value then may be compared to a threshold value or confidence value(s) determined for other users verifying for the same event/drop to determine whether the user presence should be verified to receive the reward (or not verified). If the user is not verified, then the verification server 104 may request the user re-validate their presence (if possible, e.g., within the time of the event/drop). The confidence value may be based on a comparison between captured data and data provided by the creator device 102, other user devices 114, beacons 116, etc. The verification server 104 may also consider prior user history, user/creator profiles, etc. in determining verification. For example, users/user devices 114 may have a rating based on previous activity (verifications, receipt of NFTs, inclusion of profile/payment data, etc.) which may be used to weight their impact on another user's confidence value.

In one exemplary embodiment, a plurality of user devices and a creator device 102 may send verification data to the verification server 104. The verification data may include recorded audio or a fingerprint of the recorded audio. The audio/fingerprint from the creator device 102 may be considered the highest quality audio/fingerprint against which user verifications are judged. In some embodiments, creator device 102 audio/fingerprints are given the highest weight, but other user validation audio/fingerprints are used to validate/compare against each other/a validation by a particular user device 114.

The verification server 104 may compare audio and/or fingerprints of the audio to determine whether there are duplicates in the data received. Exact duplicates of audio files or fingerprints would indicate spoofed/duplicated data. Differences based on recording device (microphone on the user device 114), location in the venue (by speakers, loud fans, etc.) are to be expected. Fingerprints within a threshold similarity may be verified or the confidence value may be increased commensurate with the similarity, whereas fingerprints outside the threshold may not be verified or the confidence value lowered commensurate with the similarity.

In one example, where verification information of a user is provided by a trusted device, e.g., beacon 116, calculation of a confidence value may be bypassed and the user account automatically verified. This may occur where a user device 114 performs a data exchange with a beacon 116 during a drop.

In another example, the verification server 104 processes the verification data through an AI model to verify the user.

The AI model may be trained on previous verification data to determine whether a user submission should be verified.

In one specific implementation, the verification server 104 may receive one or more user interaction ("bump") records from user devices 114A-E. The records may be generated by a user device 114A when the user device 114A detects the proximity of other user devices e.g., the user device 114B. During the interaction, the users may also exchange histories/fingerprints of histories. The verification server 104 may receive both record histories/fingerprints of histories (of both user device 114A and B). The verification server 104 may compare the collected histories/fingerprints of histories (from user devices 114A and 114B) to determine whether the histories are consistent with each other and other bump histories involving the same user devices 114A-E. Presented (and consistent) bump records by the user device 114A or inclusion in the bump records of another user device 114B may be used, by the verification server 104, to increase a generated confidence value or, alternatively, verify the user device 114A outright.

Verification data may be verified by searching audio for steganographic data; audio without the (accurate) steganographic data may be readily identified as invalid by the verification server 104.

Upon verification, the verification server 104 may send a command to the blockchain 108 to mint NFTs for the verified users (step 220). Sending the command to the blockchain 108 may include sending the command to one or more mining nodes of the blockchain 108 to execute the command/process the commands which interact with (e.g., call functions of) the smart contract to mint NFTs/associate the NFTs with particular metadata, and/or perform other NFT/smart contract-based functions. The command(s) may indicate the address of the previously deployed smart contract. The verification server 104 may sign the command with its own credentials (private key) or the private key of another user (e.g., the creator). An NFT asset may be selected by the verification server from a previously generated set (with, e.g., a set traits) and the metadata of the NFT asset included in the command to mint the NFT. The verification server 104 may also include user metadata in minting the NFT including the wallet address of the user. In some embodiments, the verification server 104 sends one or more commands individually to generate NFTs individually. In other embodiments, commands may create multiple NFTs at once for different verified users.

Alternatively, the verification server 104 may wait a predetermined period of time to accept or process requests for the reward (e.g., after the end of the reward period closes). For example, verified entrants may be collected during a contes and the reward/NFT may be awarded randomly to one or more winners. Similarly, multiple levels of prizes may be awarded (e.g., a certain number of grand prizes, first prizes, second prizes, etc.). Consolation rewards/NFTs may be awarded to non-winners. Verified users may be alerted whether and how much they won in the contest by the verification server 104 (or via receipt of the NFT in their digital wallet).

In some examples, the verification server 104 uses one or more verification nodes to provide verification. The verification nodes may be associated with the creator (e.g., users in the community of the creator). For example, verification nodes may include one or more user devices 114A-E that have previously associated (in their user profile) with the creator. Additional rewards (NFTs, discounts, placement on or points toward a leaderboard) may be offered to user devices 114 that act as verification nodes. In some implementations, a verification node may have interaction "bump" history with the particular verifying device. The verifying node may be able to verify portions of the bump history of their peers privately using their internal fingerprint records (e.g., without exposing their own bump history).

The group of verification nodes may each receive different partial versions of the verification data provided by the user device 114 which may be distributed by the verification server 104. In some examples, the verification data provided to the verification nodes may be anonymized by the verification server 104 before sending it to the verification nodes. The group of verification nodes may independently determine whether the user should be verified by calculating a confidence value. The verification nodes may be polled, by the verification server 104, to determine whether they believe the user should be verified based on the data they received. Alternatively, the verification nodes may independently send commands to the blockchain 108 which may generate the NFT for the user if a sufficient number (e.g., a majority, a super majority) send in a command to verify the user/generate the NFT.

Verification server 104 may request approval or confirmation from a creator/creator device 102 before final verification of a user/providing a reward. This may be an option available to creators when setting up the drop.

One or more nodes of the blockchain 108 may generate one or more NFTs based on the command from the verification server 104 (step 222). The minted NFTs may be sent to the digital wallets of one or more users (step 224). In some embodiments, the minting command (sent from the verification server 104) both mints the NFT and transfers/gives ownership to a particular wallet address of the verified user.

The NFT may be added to the account/digital wallet associated with the user at the verification server 104 (step 226). The NFT may be added to or associated with the user's account. The user may interact with/transfer/trade/or sell the NFT on a marketplace on the verification server 104. The NFT may also be traded on third-party marketplaces, e.g., OpenSea, etc.

The NFT may include one or more user benefits to be provided by the creator/the creator device 102 (step 228). The creator device 102 may provide that benefit to the NFT holder. Such a benefit may include access to events (digital or real-world), early access to tickets/merchandise, discounts for tickets/merchandise, etc.

The user device 114 may alert the user to the receipt of the NFT reward (step 230). The received NFT may be displayed/played for the user on the user device 114.

Alternatively, the reward may include a non-blockchain-based award. For example, a coupon/discount/ticket may be sent to or associated with a user off the blockchain **1*o*8. For example, a discount code, customized music file/image, merchandise, or other reward may be sent to a user's email address, mailing address, or associated with an account of the user at the verification server 104**.

Proof-of-Sound and its Applications

Various aspects of the present disclosure are directed to a new form of proof and its applications. In one exemplary embodiment, "proof-of-sound" is used to secure a blockchain ledger. As used herein, "proof-of-sound" refers to a cryptographic proof that sound was transmitted and/or received. Proof-of-sound is based on a transient signal (acoustic waves) thus merely copying the data structure does not duplicate the proof-of-sound; in other words, proof-of-sound imposes conservation just like other proofs.

Historically, blockchain applications (cryptocurrency, etc.) have focused on "mining" artificially scarce resources.

For example, bitcoin miners mine bitcoins which are algorithmically limited; the total number of coins in circulation asymptotically approach a fixed limit of 21 million bitcoins. Artificial scarcity adds to the speculative value of cryptocurrencies and has significantly contributed to their popularity. In contrast, proof-of-sound does not have any inherent scarcity-instead the limitations of sound are a property of their physical transient nature. Multiple participants may independently observe an audio signal, however acoustic waves do not persist over time. In other words, a single audio signal could result in many valid proof-of-sounds but only for the brief time that the audio signal is "in-flight". Additionally, physical channel characteristics can affect an audio signal (e.g., echo, humidity, ambient noise, device sensitivity, etc.). Each differently situated observer may be able to generate a different, but also valid, proof-of-sound for the same played audio. These factors in combination, make sound ill-suited for "mining" type applications.

Figure 4:
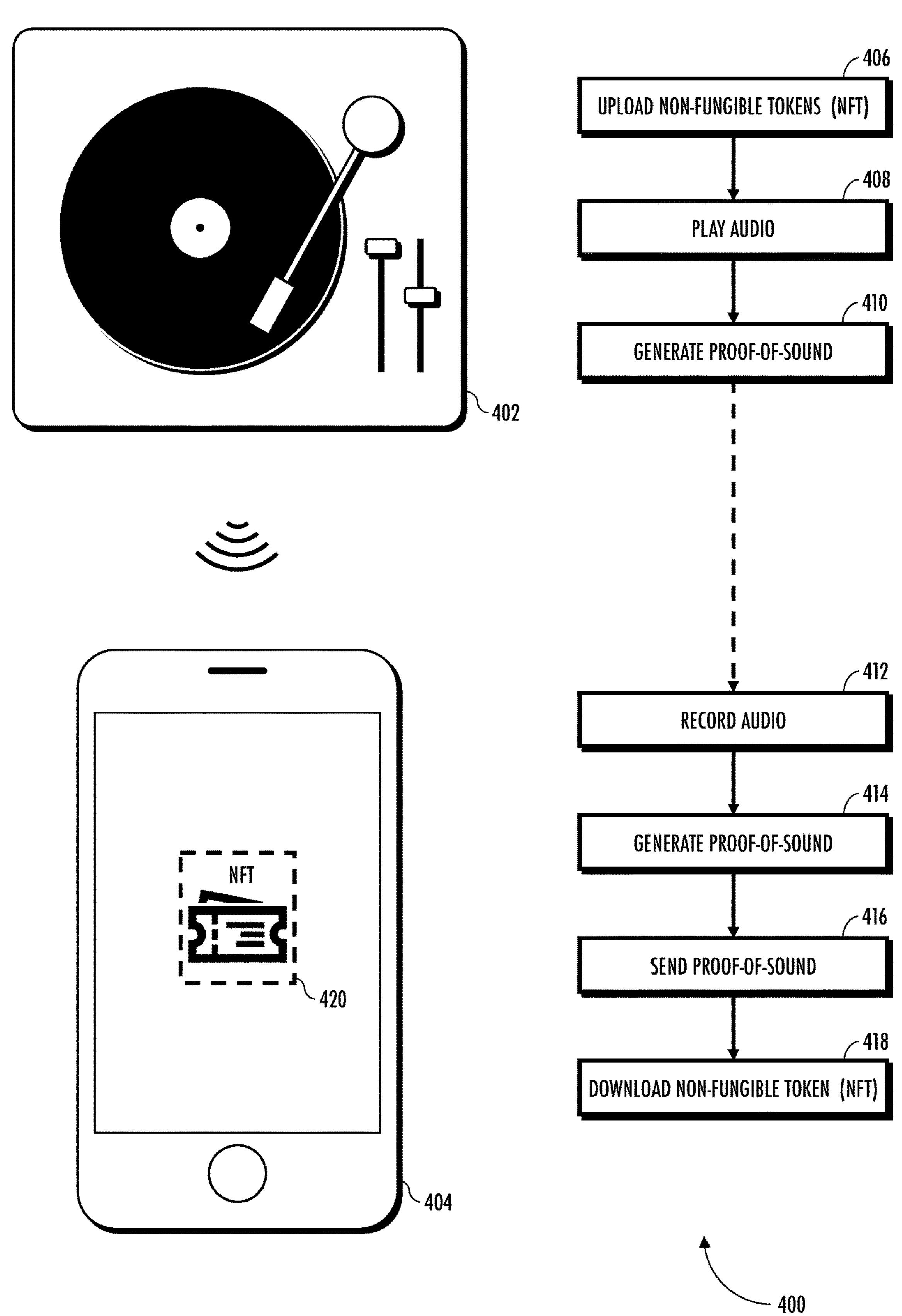
FIG. 4 is a logical block diagram of one exemplary system for transferring digital assets using "proof-of-sound" in accordance with various aspects of the present disclosure.

FIG. 4 is a logical block diagram of one exemplary system 400 for transferring digital assets using "proof-of-sound" in accordance with various aspects of the present disclosure. In the illustrated scenario, a Musician (such as a disc jockey (DJ)) downloads a "creator application" onto their musical equipment 402 (e.g., a turntable that runs a Virtual Studio Technology (VST) application within a Digital Audio Workspace (DAW)). Similarly, Fans can each download a "listener application" to their smart phone 404, smart watch, smart key fob (or similar device). In some variants, the creator and/or listener application may be different modes of the same application software. As part of the application configuration process, both the Musician and the Fans each create a digital wallet (or link an existing digital wallet) for accessing their digital assets.

Prior to a live performance, the Musician creates one or more non-fungible tokens (NFTs) on a blockchain which are associated with their digital wallet (step 406). Additionally, the Musician formalizes the conditions for delivery of NFTs within smart contracts ("smart K"). In one exemplary implementation, a smart contract is implemented as a block of the blockchain ledger and includes the compiled code for the smart contract. Typically, a smart contract will specify the offer, and conditions for performance. A bilateral contract may also require acceptance before the smart contract is formed, whereas unilateral contracts are formed by performance (acceptance ahead of time is not required). As but one such example, the Musician may create a bilateral contract that requires the Fans to opt-in by providing, for example, their contact information and a valid proof-of-sound for 'premium NFTs' (bilateral contract), but any Fan that provides valid proof-of-sound may qualify to receive 'standard NFTs' (unilateral contract). As another bilateral example, a Musician may offer preferential NFTs to an Influencer, contingent on the Influencer getting enough Followers to the concert; however failing to get a minimum number of Followers may result in breach consequences (e.g., reduction and/or revocation of Influencer access, etc.). In some cases, the Influencer may or may not accept the bilateral contract, depending on whether or not they think they can satisfy the contract performance.

During a live performance, the Musician's creator application and the Fan's listener application both obtain audio data for the performance. For example, the Musician's creator application may obtain the digital audio waveforms that are generated by the VST (step 408). In some variants, the Musician's version of the digital audio waveform (before being played over speakers) may be treated as a "clean" copy since it does not have any ambient noise; this may be sent to the blockchain network and identified as such. Concurrently, the Fan's listener application may record audio from the device's microphone (step 412).

In one specific embodiment, each of the creator/listener applications generate a proof-of-sound from the same performance (steps 410 and 414); the proofs-of-sound are sent to a blockchain network for verification (step 416). In an alternative embodiment, the creator application may create a proof-of-sound that is validated by the listener applications (e.g., the listener applications provide the blockchain network verification). In another such embodiment, the creator application may validate proof-of-sounds that were captured by the listener applications (e.g., the creator application provides the blockchain network verification). In still other embodiments, the creator application and the listener applications may both create proofs that are independently verified by e.g., the blockchain network, another third party, etc. Virtually any combination of creation, recording, validation/verification may be substituted with equal success, given the contents of the present disclosure.

In one specific implementation, an audio (or acoustic) fingerprint may be generated from the audio signal; each fingerprint numerically represents identifying characteristics of the audio signal (as described above).

While the foregoing discussion is presented in the context of audio fingerprints, analogous techniques may be used for other device sensor measurements (as described above). More generally, any captured data/sensor data may be processed to prove capture/observation. In other words, these different techniques may be broadly extended to any proof of physical environment (proof-of-visual-performance, proof-of-dance, proof-of-bump, etc. described in greater detail below). Additionally, it is appreciated that different modalities of fingerprints may be used to discern between different parties; for example, Fans that are standing next to one another may record substantially the same audio fingerprints, but they may have different physical motion (dance). When taken as a collective, each Fan may have a unique combination of different proofs.

Audio fingerprints may be validated before they are converted to proof-of-sound (as described above). In some implementations, different fingerprints may be validated based on other fingerprints for the same audio signal. As previously noted, most proofs are zero-knowledge proofs i.e., they can be validated independently from one another and are often treated as such. Proof-of-sound may provide substantial improvements over other zero-knowledge proofs because they can be additionally verified against other shared records of the same event. In other words, each valid proof-of-sound is an incremental improvement to the network's overall information for the recorded event. For example, a Fan's fingerprints may need to match the Musician's fingerprints after accounting for differences in ambient noise, device capture, propagation delay, etc. As another example, a plurality of fingerprints (the fingerprints recorded by all the Fans) may be assessed in aggregate to identify outliers. In some cases, this may be necessary to protect against spoofing and/or man-in-the-middle type attacks. Still other implementations may validate fingerprints against other sensory modalities; for example, proof-of-bass (low frequency sound) may be checked against accelerometer and/or gyroscope data. This may be useful where bass range notes shake nearby devices to a measurable degree.

In some cases, the fingerprints may be directly used as proof-of-sound. This may be useful where computational complexity and/or the value of the transaction does not warrant additional cryptographic complexity. For example, fingerprints may suffice as proof-of-sound where the NFT has little/no value. In other cases, the fingerprints may be cryptographically secured and/or obfuscated to enhance blockchain security. Notably, blockchains inherently accumulate hashing power; thus, hashing the audio fingerprints (which may include both primary and/or secondary characteristics) with capture timestamp information and previous transaction information may still impart substantial protections against would-be attackers. In some cases, a block with a proof-of-sound may include both the timestamp of capture, as well as the timestamp of publication; this may be particularly useful where the point of capture occurs at a substantial time shift from the point of publication.

In one embodiment, transactions are transmitted to the blockchain network for recording in the distributed ledger. As previously alluded to, each blockchain node of the blockchain network receives a copy of the transaction and locally authenticates the transaction. When the blockchain network has achieved consensus, the transaction has been successfully added to the distributed ledger.

In one exemplary embodiment, each blockchain node runs a multi-layered protocol. Each layer of the multi-layered protocol has a limited set of tasks/functionality; subdividing complex tasks into different layers greatly improves overall system robustness and performance. In one specific implementation, each blockchain node has an authentication layer that authenticates, records, and assigns a unique identifier to transactions (played/recorded audio fingerprints, transaction requests, etc.). In one such variant, the authentication layer may additionally match parties with their counterparties to ensure that transactions are valid. For example, a party (e.g., Musician) may stream its music and its counterparty (e.g., Fans) may record the music; matching the transactions may entail validation and/or verification of the proof-of-sounds. For example, the proof-of-sound may be validated as being recorded/captured at a particular time/place based on steganographic data; additionally, the proofs-of-sound may be used to verify the counterparties (e.g., that the music that was recorded was played, and that the music that was played was recorded, etc.).

In one specific implementation, once both the Musician and Fans can secure blockchain activity with proof-of-sound transactions, the blockchain ledger may automate smart contract execution. For example, when the party/counterparty have successfully authenticated transactions, NFT 420 may be disbursed (step 418). In particular, the Musician can provide proof-of-sound (played) and the Fans can provide their proof-of-sound (recorded); a smart contract may automatically transfer NFTs based on a successful matching of recorded and played proof-of-sounds (subject to the aforementioned validation checks for time of capture, uniqueness of proof, etc.)

A wide variety of different transactions are enabled by present disclosure. For example, a listener can win a drawing for free tickets by proving that they regularly listen to the radio, at regular constant intervals. In another such example, an audience member can receive limited run NFTs for proving that they attended a movie premier. Furthermore, concert goers may receive special edition album art based on their proven attendance. Other proof-of-sound applications may leverage different times/locations. For example, time-shifted/location-shifted applications may allow, e.g., internet celebrities to contact their streaming audience across large distances, or commercial merchants to reach their customers whenever a commercial is played.

Generalized Apparatus and Methods

Figure 5:
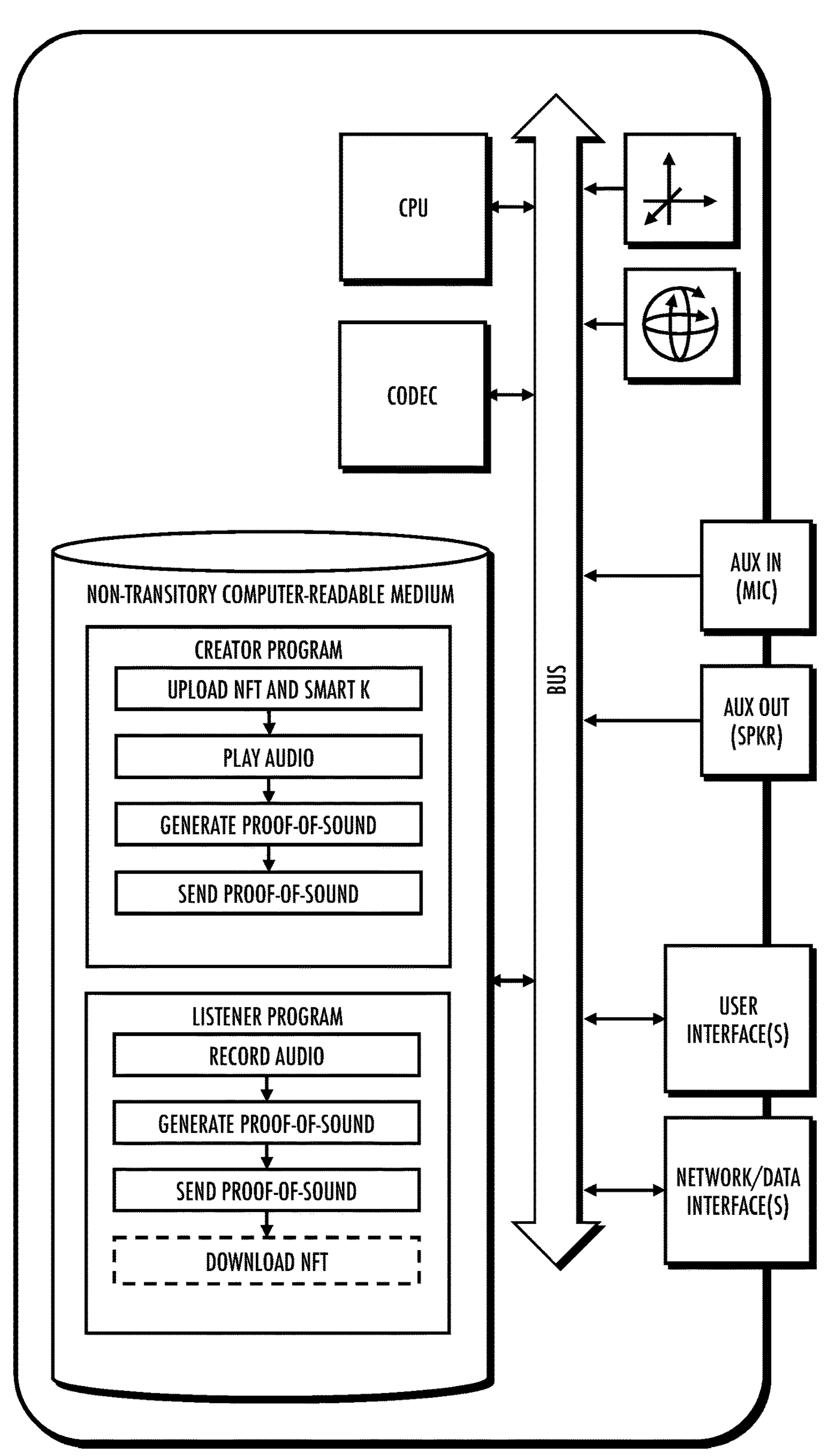
FIG. 5 is a logical block diagram of one creator/listener device in accordance with various aspects of the present disclosure.

FIG. 5 is a logical block diagram of one generalized creator/listener device in accordance with various aspects of the present disclosure. The creator/listener device includes a processor subsystem, a memory subsystem, a sensor subsystem, a user interface subsystem, a network/data interface subsystem, and a bus to connect them.

In one embodiment, the creator/listener device may be a musical instrument. For example, a creator device may be a digital audio mixing device (e.g., a laptop) running Virtual Studio Technology (VST) applications within a Digital Audio Workspace (DAW) such as may be used for disc jockey applications. As another example, a listener device may be a smart phone or a smart keychain fob running a software application. Other embodiments of creator/listener devices may include without limitation: smart watches, smart jewelry, smart key fobs, tablets, laptops, televisions, musical instruments, cameras, speakers, or other recording devices, smart appliances and any other source of audio/visual data. While the foregoing examples are presented in the context of a creator device or a listener device, artisans of ordinary skill in the related arts will readily appreciate that hybrid devices may incorporate both creator and listener functionality within the same device (e.g., play-along type applications, etc.).

In one embodiment, the processor subsystem may read instructions from the memory subsystem and execute them within one or more processors. The illustrated processor subsystem includes: a central processing unit (CPU), and a hardware codec. In one specific implementation, the CPU controls device operation and/or performs tasks of arbitrary complexity/best-effort. CPU operations may include, without limitation: operating system (OS) functionality (power management, UX), memory management, etc. In one specific implementation, the hardware codec converts audio/visual data to an encoded data for transfer and/or converts encoded data to audio/visual data for playback. Other processor subsystem implementations may multiply, combine, further subdivide, augment, and/or subsume the foregoing functionalities within these or other processing elements. For example, co-processors and/or hardware accelerators may be used to accelerate media tasks (e.g., graphics processing, etc.). Similarly, codec functionality may be subsumed within CPU operation via software emulation.

In one embodiment, the sensor subsystem may sense the physical environment and capture and/or record the sensed data. In some embodiments, the sensor data may be further stored as a function of capture time (so-called "tracks"). Tracks may be synchronous (aligned) or asynchronous (non-aligned) to one another. The illustrated sensor subsystem includes a camera, microphone, accelerometer, and/or gyroscope. In one specific implementation, the microphone senses acoustic vibrations and converts the vibrations to an electrical signal (via a transducer, condenser, etc.). The electrical signal may be further transformed to frequency domain information. In one specific implementation, the accelerometer measures acceleration and gyroscope measure rotation in one or more dimensions.

In one embodiment, the user interface subsystem may be used to present media to, and/or receive input from, a human user. In some embodiments, media may include audible, visual, and/or haptic content. Examples include images, videos, sounds, and/or vibration. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen). In one embodiment, the user interface subsystem may include an assortment of a touchscreen, physical buttons, and a microphone.

In one embodiment, the network/data interface subsystem may be used to receive data from, and/or transmit data to, other devices. In some embodiments, data may be received/transmitted as transitory signals (e.g., electrical signaling over a transmission medium). In other embodiments, data may be received/transmitted as non-transitory symbols (e.g., bits read from non-transitory computer-readable mediums). The network/data interface subsystem may include: wired interfaces, wireless interfaces, and/or removable memory media. In one embodiment, the network/data interface subsystem may include network interfaces including, but not limited to: Wi-Fi, Bluetooth, Global Positioning System (GPS), USB, and/or Ethernet network interfaces.

In one embodiment, the memory subsystem may be used to store data locally at the creator/listener device. In one embodiment, data may be stored as non-transitory symbols (e.g., bits read from non-transitory computer-readable mediums). In one specific implementation, the memory subsystem is physically realized as one or more physical memory chips (e.g., NAND/NOR flash) that are logically separated into memory data structures.

In one embodiment, the program code includes non-transitory instructions that when executed by the processor subsystem cause the processor subsystem to perform tasks which may include: calculations, and/or actuation of the sensor subsystem, user interface subsystem, and/or network/data interface subsystem. In some embodiments, the program code may be statically stored within the creator/listener device as firmware. In other embodiments, the program code may be dynamically stored (and changeable) via software updates. In some such variants, software may be subsequently updated by external parties and/or the user, based on various access permissions and procedures.

In one aspect, the creator/listener device may be configured to create (e.g., in "creator mode") and receive (in "listener mode") digital assets that can be transferred to others based on presence verification, proof-of-sound and/or other proofs (proof-of-visual-performance, proof-of-bump, etc.).

During a first step, the creator device receives input from a creator regarding details of an NFT. The creator device may create NFT assets for creation of the NFTs including media (e.g., visual art/audio with various characteristics/traits). For example, the creator device may record various parts of a song and packages those separately as characteristics that may be selected from for use in NFT generation. The creator device may create/package the data for minting one or more NFTs/smart contracts to create NFTs. In one example, the creator device uploads these configuration details, art, audio, metadata, etc. to a verification device for creation and deploying the smart contract (and later minting of the NFTs).

In another example, the creator device uploads digital assets that are queued for adding to the blockchain. In one embodiment, the creator device creates a digital wallet, or accesses an existing digital wallet. The digital wallet is stocked with non-fungible tokens (NFTs) that are uploaded to the interplanetary file system (IPFS) or other storage server. In one variant, the terms of a smart contract may also be provided to a blockchain ledger; the smart contract may specify the terms of acceptance and/or performance. For example, the smart contract ("smart K") may identify a requisite quantity/quality of audio that must be proven, the amount of time that the offer is open, a number of NFTs that are available (e.g., first-come-first-serve basis), etc.

During a second step, the creator device obtains audio. In one embodiment, the creator device generates the audio during playback. For example, a disc jockey may use a Virtual Studio Technology (VST) application running within a Digital Audio Workspace (DAW), to generate digital audio. The digital audio may be directly obtained from the DAW as digital data; alternatively, the digital audio may be played via speakers and received in the creator application as acoustic information from a microphone. Some variants may additionally obtain information from other sensors (e.g., accelerometer, and/or gyroscope, encrypted data, steganographic codes, etc.). This information may be used to generate proof-of-sound that is frequency specific (e.g., proof-of-bass, proof-of-treble, etc.).

While the foregoing examples are presented in the context of audio, other variants may be substituted with equal success. For example, some variants may additionally obtain non-audio information from other sensors (e.g., camera sensors can be used to detect visible light, infrared, and/or ultraviolet; similarly, accelerometers and/or gyroscopes may be used to sense motion, etc.). This information may be used to generate other forms of proof e.g., proof-of-visual-performance, proof-of-dance, etc.

Similarly, while the foregoing examples are presented in the context of perceived audio, imperceptible signaling (acoustic, electromagnetic radiation, etc.) may be used. For example, steganographic techniques may be used to embed audio watermarks within the audio signal. The audio watermarks may be imperceptible to humans but may be sensed by listening devices and used to e.g., improve signal recognition, provide robust detection, improve security, etc.

In a third step, in some exemplary embodiments, the creator device generates a proof-of-sound (played) based on the played audio. In one embodiment, the proof-of-sound (played) is a digital fingerprint of the audio that is cryptographically hashed. In some variants, audio may also be encrypted based on steganographic codes. Depending on the nature of the audio, the fingerprint may require a minimum capture length (e.g., a few seconds, a few minutes, etc.). For instance, the creator of the audio may generate audio fingerprints for an entire song (with a definite start and stop); listeners may only have the ability to generate audio fingerprints based on human UI interactions (e.g., the start and stop may be early/late and/or include intermittent interruptions of unknown length). In some variants, the fingerprints may be additionally cryptographically hashed. Examples of cryptographic hashes may include, e.g., the Secure Hashing Algorithm and its variants (e.g., SHA256, SHA384, SHA512), Message Digest and its variants (MD2, MD4, MD5, MD6, etc.), fuzzy hashing, and/or other hash technologies.

In a fourth step, the proof-of-sound (played) may be transmitted to the blockchain ledger for use with the smart contract. In one embodiment, provisioning the proof-of-sound (played) may be a required condition of the smart contract.

In another aspect, the creator/listener device may be configured to receive digital assets based on proof-of-sound (i.e., "listener mode") and/or other proofs (proof-of-visual-performance, proof-of-bump, etc.).

During a first step, the listener device records audio. In some cases, the listener device may additionally receive information about the recorded audio. For example, the user may scan a QR code, input a concert venue code, or even manually enter identifying information for the audio being recorded. The digital audio may be received in the listener application as acoustic information captured via one or more microphones. As previously noted, some variants may additionally obtain information from other sensors (e.g., accelerometer, gyroscope, imaging sensors, etc.).

During a second step, the listener device generates a proof-of-sound based on the recorded audio. In one embodiment, the proof-of-sound (recorded) is a digital fingerprint of the recorded audio that is cryptographically hashed. In some examples, the proof-of-sound may be a dataset for presence verification including media (audio/video), sensor data, data from other users, data from venue devices (beacons), etc. to prove the creator/listener device was present for the drop.

As a brief aside, the various aspects of the present disclosure enable a first party (the creator) to prove to others (the verifiers) that audio was played by the creator via proof-of-sound (played). Similarly, a second party (the listener) can prove to others (the verifiers; a verification device) that audio was recorded by the listener via proof-of-sound (recorded). For example, a DJ playing music in a concert hall may provide digital audio proof-of-sound (played) directly from the audio jack (or digitally), which would not include concert noise; in contrast, an audience member may provide proof-of-sound (recorded) based on a microphone recording that also captures nearby chatter and/or ambient noise. As a practical matter, the proof-of-sound (played) and proof-of-sound (recorded) may be very different; however, they need not be identical, merely sufficiently similar to prove that the acts of playing and recording actually occurred. In some cases, uniqueness of each proof-of-sound may additionally provide security benefits that prevent replay attacks/counterfeiting.

Depending on the application and/or usage, different levels of similarity, accuracy, and/or authentication may be used (as discussed above).

In some variants, embedded steganographic data may be used to provide additional robustness and/or time shifting capabilities (as described above). In some embodiments, the listener device may check for the steganographic data prior to generating proof-of-sound; when absent, the listener device may not generate proof-of-sound. In other embodiments, proof-of-sound that is generated without the steganographic data may be readily identified as invalid by the blockchain network/verification device. Still other techniques for identifying fraudulent data based on steganographic techniques are widely understood in the cryptographic arts and may be substituted with equal success.

As a further optimization, steganographic data can also be used to compensate for limited network connectivity. For example, wireless kiosks are often distributed throughout a concert venue to relay traffic and improve overall network connectivity. Additionally, however, the wireless kiosks may generate continuous authentication codes which are transmitted as steganographic audio codes; the superposition properties of audio waveforms will allow the recording device to capture both the music and the steganographic information. In this manner, proof-of-sound may be verified at a later time (the superposition of the music and steganographic codes proves concurrent recording at a time and place).

Referring back to FIG. 5, in certain embodiments, once the proof-of-sound (recorded) has been generated, the proof-of-sound (recorded) may be transmitted to the blockchain ledger. If the proof-of-sound fulfills the performance requirements of a smart contract, then the listener device may be granted access to a digital asset. In other embodiments, the proof-of-sound and other verification data may be transmitted to a verification device for verification prior to the verification device minting the NFT (using the smart contract) by sending a transaction/command to nodes of the blockchain network.

In some embodiments, the user may download the digital asset for consumption (viewing, etc.); in other embodiments, the digital asset may be held in the user's digital wallet until used.

Figure 6:
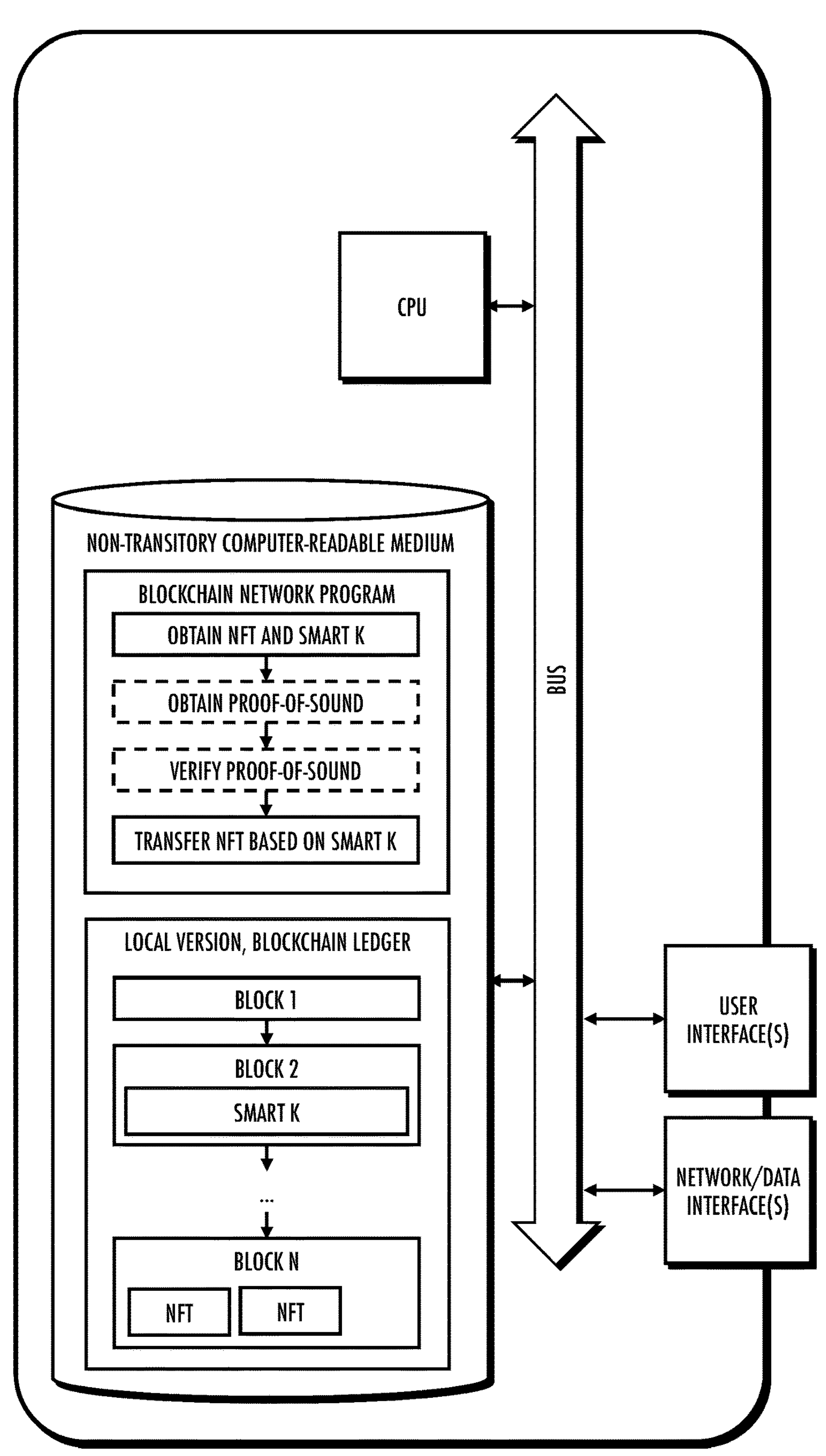
FIG. 6 is a logical block diagram of one blockchain node in accordance with various aspects of the present disclosure.

FIG. 6 is a logical block diagram of one blockchain node in accordance with various aspects of the present disclosure. The blockchain node includes a processor subsystem, a memory subsystem, a user interface subsystem, a network/data interface subsystem, and a bus to connect them.

In one embodiment, the blockchain node may be a network appliance that is dedicated for blockchain computing. For example, a blockchain node may be implemented as one or more servers within a server farm. In other embodiments, the blockchain node may be one of many different applications running on a device. For example, a user may use their laptop or cellular device as a consumer device and use its surplus resources to operate as a node for a blockchain network.

In one embodiment, the processor subsystem may read instructions from the memory subsystem and execute them within one or more processors. The illustrated processor subsystem includes: a central processing unit (CPU) and/or one or more graphics processing units (GPUs). In one specific implementation, the CPU controls device operation and/or performs tasks of arbitrary complexity/best-effort. CPU operations may include, without limitation: operating system (OS) functionality (power management, UX), memory management, etc. In one specific implementation, the GPU performs repetitive parallelized computations (such as are common within blockchain operations). Typically, a GPU may include a dedicated memory, deeply pipelined ALUs (Arithmetic Logic Units) and/or MACs (Multiply Accumulates). Other processor subsystem implementations may multiply, combine, further subdivide, augment, and/or subsume the foregoing functionalities within these or other processing elements.

In one embodiment, the user interface subsystem may be used to present media to, and/or receive input from, a human user. In some embodiments, media may include audible, visual, and/or haptic content. Examples include images, videos, sounds, and/or vibration. In some embodiments, input may be interpreted from touchscreen gestures, button presses, device motion, and/or commands (verbally spoken). The user interface subsystem may include physical components (e.g., buttons, keyboards, switches, scroll wheels, etc.) or virtualized components (via a touchscreen). In one embodiment, the user interface subsystem may include an assortment of a touchscreen, physical buttons, and a microphone.

In one embodiment, the network/data interface subsystem may be used to receive data from, and/or transmit data to, other devices. In some embodiments, data may be received/transmitted as transitory signals (e.g., electrical signaling over a transmission medium). In other embodiments, data may be received/transmitted as non-transitory symbols (e.g., bits read from non-transitory computer-readable mediums). The network/data interface subsystem may include: wired interfaces, wireless interfaces, and/or removable memory media. In one embodiment, the network/data interface subsystem may include network interfaces including, but not limited to: Wi-Fi, Bluetooth, Global Positioning System (GPS), USB, and/or Ethernet network interfaces.

In one embodiment, the memory subsystem may be used to store data locally at the blockchain node. In one embodiment, data may be stored as non-transitory symbols (e.g., bits read from non-transitory computer-readable mediums). In one specific implementation, the memory subsystem is physically realized as one or more physical memory chips (e.g., NAND/NOR flash) that are logically separated into memory data structures. The memory subsystem may be bifurcated into blockchain network code and/or blockchain ledger data. In some variants (for a "full node"), the blockchain ledger data may be complete (i.e., the entire transaction history of the blockchain). In other variants (for a "light node"), the blockchain ledger may be incomplete, include only a subset of blocks/transactions, or include only the last number of blocks/transactions. Smart contracts and NFTs may be recorded as transactions in blocks of the blockchain. In some variants, blockchain network code and/or blockchain ledger data may also be further subdivided for smart contract execution. For example, successful offer, acceptance (where necessary), and performance of a smart contract may result in a transfer of digital assets that are recorded within the blockchain.

In one embodiment, the program code includes non-transitory instructions that when executed by the processor subsystem cause the processor subsystem to perform tasks which may include: calculations, and/or actuation of the user interface subsystem, and/or network/data interface subsystem. In some embodiments, the program code may be statically stored within the blockchain node as firmware. In other embodiments, the program code may be dynamically stored (and changeable) via software updates. In some such variants, software may be subsequently updated by external parties and/or the user, based on various access permissions and procedures.

In one aspect, the blockchain node may be configured to participate within the decentralized governance of a blockchain ledger. For example, the blockchain node may perform mining operations to add new blocks to the blockchain and/or executing transactions on the blockchain. As compensation, the blockchain node may receive a reward to add a new block and/or transactions to a block or process transactions on the blockchain. The reward may be from the blockchain network or transferred from users of the blockchain network interacting with or adding transactions to the blockchain.

In one embodiment, the blockchain ledger may enable smart contract execution based on proof-of-sound.

In a first embodiment, a smart contract may be deployed by the creator/creator device or from a third-party device (e.g., a verification device). The smart contract may include access provisions to trigger certain functions (e.g., minting NFTs, modifying the contract, changing metadata associated with the smart contract or NFTs, etc.). A listener device/application may authenticate with the proof-of-sound to interact with a smart contract on the blockchain and mint an NFT. For example, a listener device/application may fulfill the conditions of the access provisions in the smart contract by including a proof-of-sound which may be verified by the blockchain node prior to execution of a transaction by the blockchain node (at the request of the listener device/application) to, e.g., mint/transfer/modify an NFT and inclusion on the blockchain.

In a further embodiment, during a first step, the blockchain node obtains digital assets from a creator device. In one example, the digital assets may be associated with a digital wallet of the creator device and associated with a smart contract.

At a second step, the blockchain node obtains proof-of-sound. In one embodiment, the proof-of-sound attests that audio was played e.g., proof-of-sound (played). In one embodiment, the proof-of-sound attests that audio was recorded e.g., proof-of-sound (recorded). In some variants, proof-of-sound may include additional sensory modalities. In some variants, the proof-of-sound may also qualified in precision/accuracy. In some cases, steganographic techniques may be used to embed watermarks within media signals to further improve security/robustness.

Furthermore, as previously noted, the foregoing examples are presented in the context of perceptible audio however other variants may be substituted with equal success. For example, non-audio information may be used to generate other forms of proof e.g., proof-of-visual-performance, proof-of-dance, proof-of-bump, etc. As but one such example, a visual arts Performer may perform a show; Viewers wearing augmented reality (AR)/virtual reality (VR) headsets may record the performance and calculate visual fingerprints based on the video to create proof-of-visual performance. Other visual implementations could use e.g., proof-of-strobe (e.g., light flashing in time with music, controlled via a DMX light controller), etc. Similarly, a Dancer may embed accelerometers/gyroscopes within their clothing; the resulting haptic fingerprints may be used to generate proof-of-dance. The audience can record the dance (video to generate proof-of-visual-performance), or perhaps move with the dance (haptic data to generate proof-of-dance) to provide their corresponding proofs.

Once the blockchain node receives proof-of-sound, the blockchain node may verify the proof-of-sound. In some embodiments, the proof-of-sound is compared to at least one other proof-of-sound; for example, a smart contract may require that proof-of-sound (played) must match proof-of-sound (recorded) with certain conditions (e.g., time of recording, quality of recording, and/or length of recording). In other embodiments, the proof-of-sound may be sufficient as a zero-knowledge proof; i.e., the sound may be sufficient in isolation to generate proof. In other cases, the user may be provided the requisite information to generate proof-of-sound; for example, the user may receive a pre-calculated audio fingerprint (based on the Musician's clean recording, ahead of time); the user's live recording fingerprint is matched to the pre-calculated audio fingerprint (within tolerances) for verification. In other examples, the sound in combination with other data may suffice as proof (e.g., the user may receive the fingerprint information via a nearby Bluetooth/Wi-Fi kiosk, etc.).

If the proof-of-sound is verified, then the block may be added to the blockchain ledger. In some cases, the block may trigger smart contract execution. For example, the smart contract may automatically trigger transfer of a digital asset (non-fungible token) from the creator's digital wallet to the listener's digital wallet when the terms of the smart contract have been performed. In one exemplary embodiment, the smart contract may allow for a time synchronized execution. For example, the NFT can be delivered when the "beat is dropped" by the DJ (tapping a button on their VST), etc.

In another embodiment, a verification device may, based on a user's verification (including, e.g., a proof-of-sound/presence verification data) at a verification device, provide instructions to mint an NFT and transfer that NFT to the user's wallet. The blockchain node may receive the and process the transaction on the smart contract and mint the NFT on the blockchain.

Still other applications may use the techniques described herein to provide other modalities of audience engagement.

For example, user devices may use geometric analytics and proximity sensors in the creator and listener application to physically organize like-minded fans. For example, "proof-of-bump" may be used to gather like-minded users to build excitement at any concert, show, event, presentation, public area. First, the users can register for the event, and they may be offered various smart contracts (e.g., top "bumpers" at the event, fastest growers, most new friends, new membership incentives, etc.).

In one specific implementation, user devices may detect the proximity of other user devices based on Bluetooth, NFC, or other wireless technology. Each user device may generate records of encounters with others at times/places (i.e., a history of "who was bumped into"). This can provide verification means for e.g., a proof-of-bump. For example, a first individual "bumps" into another individual; each individual has an independent record of their bump (device ID, time, location) that is secured within both devices. By propagating fingerprint history of previous bumps at each new bump, the audience quickly amasses large hashing power. In order to falsify a bump, the fingerprints for both of the user devices (primary bumps), everyone the primary devices have bumped into (secondary bumps), everyone that the secondary devices have bumped into (tertiary bumps), etc. must also be modified. In other words, proof-of-bump can quickly distribute an audit of bump history that is exponentially difficult to falsify. Subsequent verification may be performed by checking that every individual's collected fingerprints are consistent with all other bump histories. Notably, each device can verify portions of the bump history of their peers privately using their internal fingerprint records (i.e., without exposing their own bump history).

Still other applications may incorporate augmented reality (AR) smart glasses and virtual reality (VR) headsets to capture visual proof (proof-of-visual-performance) and/or haptic sensors to determine movement proof (proof-of-dance). Still other modalities may be substituted with equal success, in view of the principles described herein.

Figure 7:
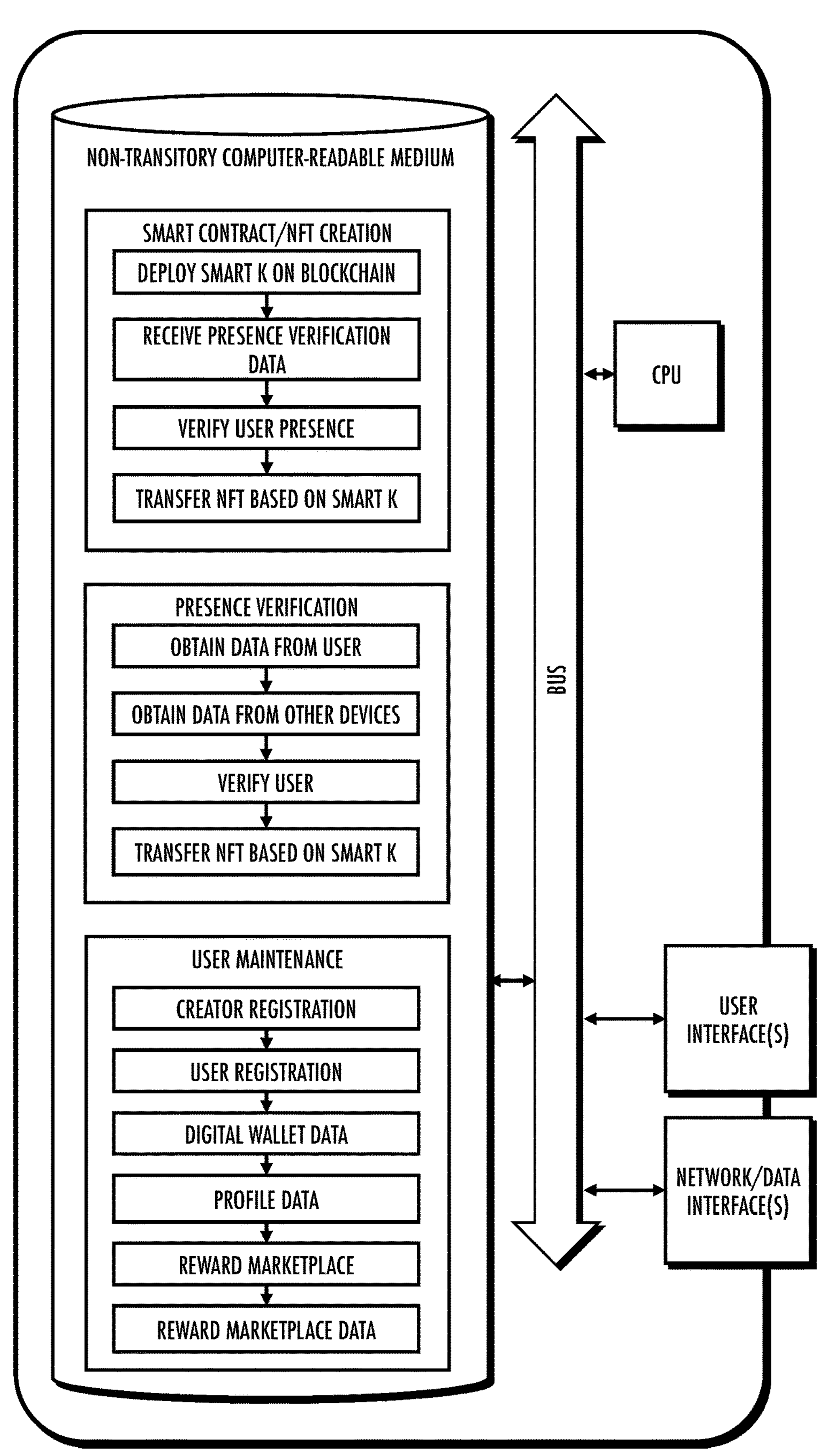
FIG. 7 is a logical block diagram of one verification device in accordance with various aspects of the present disclosure.

FIG. 7 is a logical block diagram of one generalized verification device in accordance with various aspects of the present disclosure. The verification device includes a processor subsystem, a memory subsystem, a network/data interface subsystem, and a bus to connect them.

In one embodiment, the verification device may be a server, including a server in a cloud-based environment. Other embodiments of verification devices may include without limitation personal computers, smart phones, or virtually any device that may perform data processing.

In one embodiment, the processor subsystem may read instructions from the memory subsystem and execute them within one or more processors. The illustrated processor subsystem includes a central processing unit (CPU). In one specific implementation, the CPU controls device operation and/or performs tasks of arbitrary complexity/best-effort. CPU operations may include, without limitation: operating system (OS) functionality (power management, UX), memory management, etc. Other processor subsystem implementations may multiply, combine, further subdivide, augment, and/or subsume the foregoing functionalities within these or other processing elements. For example, co-processors and/or hardware accelerators may be used to accelerate media tasks (e.g., graphics processing, etc.).

In one embodiment, the network/data interface subsystem may be used to receive data from, and/or transmit data to, other devices. In some embodiments, data may be received/transmitted as transitory signals (e.g., electrical signaling over a transmission medium). In other embodiments, data may be received/transmitted as non-transitory symbols (e.g., bits read from non-transitory computer-readable mediums). The network/data interface subsystem may include: wired interfaces, wireless interfaces, and/or removable memory media. In one embodiment, the network/data interface subsystem may include network interfaces including, but not limited to: Wi-Fi, Bluetooth, Global Positioning System (GPS), USB, and/or Ethernet network interfaces.

In one embodiment, the memory subsystem may be used to store data locally at the verification device. In one embodiment, data may be stored as non-transitory symbols (e.g., bits read from non-transitory computer-readable mediums). In one specific implementation, the memory subsystem is physically realized as one or more physical memory chips (e.g., NAND/NOR flash) that are logically separated into memory data structures.

In one embodiment, the program code includes non-transitory instructions that when executed by the processor subsystem cause the processor subsystem to perform tasks which may include: calculations, and/or actuation of the network/data interface subsystem. In some embodiments, the program code may be statically stored within the verification device as firmware. In other embodiments, the program code may be dynamically stored (and changeable) via software updates. In some such variants, software may be subsequently updated by external parties and/or the user, based on various access permissions and procedures.

In one aspect, the verification device may be configured to register creator(s) and/or user(s) of a service to connect creators and content consumers and store the registration data. Information about creators and users may be queried, received, and verified by the verification device. The verification device may be configured to store profile data of each creator/user. The profile data may be sent to other users who wish to learn about a particular creator/user as a profile page or entry. Users of the service may be able to discover and join communities of other users/creators. In some cases, the verification device may also allow users to discover communities that are related to their existing interests.

The verification device may be configured to create or associate creator/user profiles with a digital wallet on the verification device or link to a third-party digital wallet on a different server. The digital wallet may be configured to interact with and store digital currencies, tokens/NFTs, etc. on one or more blockchains. Content consumers may be rewarded by creators on the service with rewards (e.g., NFTs) which may be stored in the user's digital wallets. The verification device may also offer a digital marketplace for trading/selling rewards/NFTs received using the system or other digital or real-world assets using the service.

In another aspect, the verification device may be configured to interact with one or more blockchains. In some embodiments, the digital wallets of users may include a private key, which may be used by the verification server to sign transactions on behalf of users/creators. The verification device may receive information from a creator device to create a reward for users. The verification device may build and deploy a smart contract on a blockchain to create the reward based on selections made by and information received from the creator device. Transactions with the blockchain, by the verification device, may be signed with the private key of the verification device or the private key of the creator/creator's wallet. The verification device is configured to verify a user's presence at a drop based on data received from the user. In response, the verification device may mint one or more NFTs for the verified user by interacting with the deployed smart contract. The NFT may be accessed via the digital wallet of the user.

In another aspect, the verification device may be configured to verify the presence of a user. The verification device may receive data from a user device to perform verification of their presence at a drop. The data may include audio data, sensor data, GPS data, interaction history with other users, etc. The verification device may receive data from other devices (the creator device, other users attempting to verify their presence, beacon devices). The verification device may determine (based on a confidence rating) whether to verify the user. In response to verification, the verification device may mint and transfer an NFT or other reward to a user via the digital wallet of the user.

Figure 8:
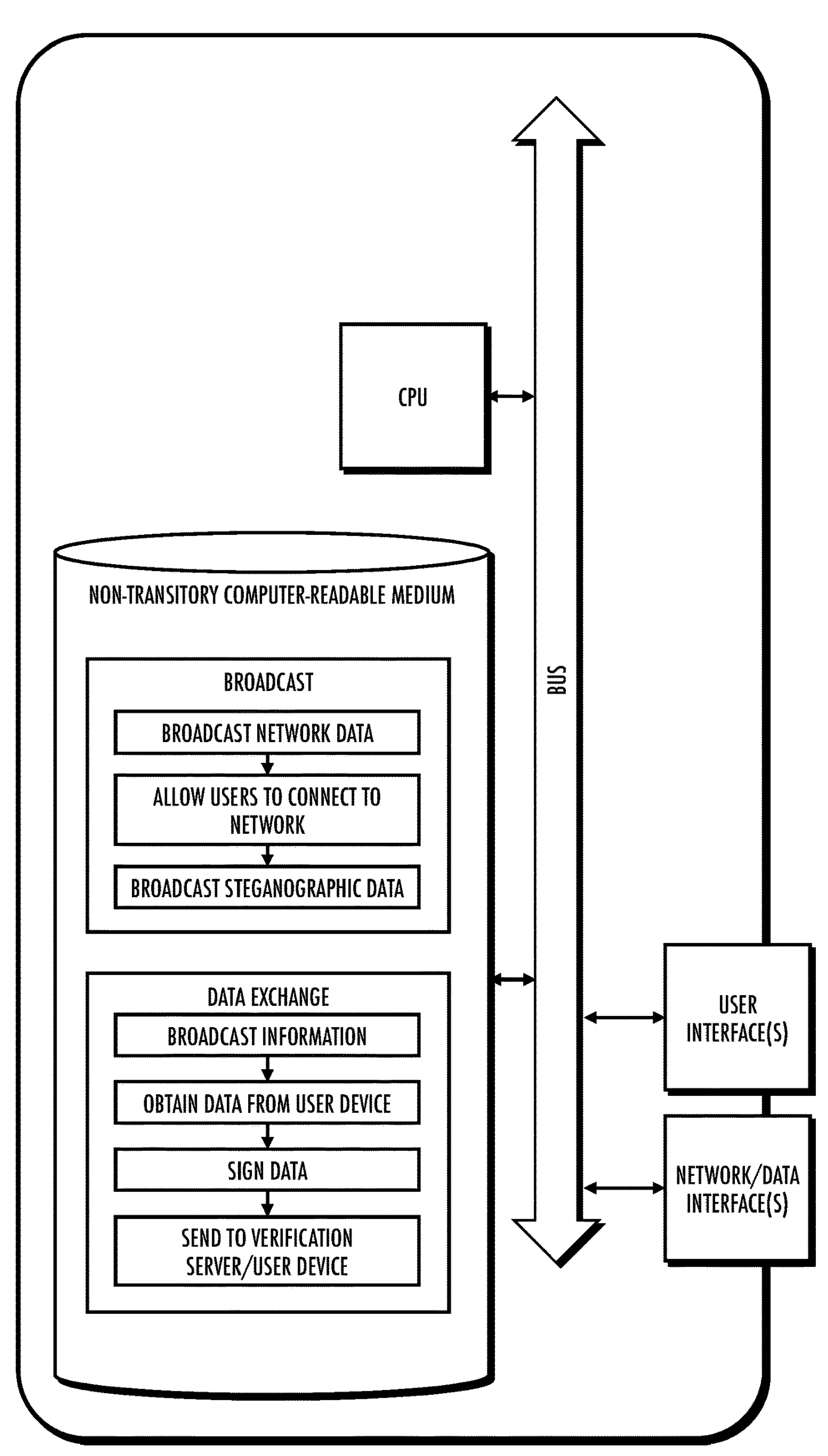
FIG. 8 is a logical block diagram of one beacon device in accordance with various aspects of the present disclosure.

FIG. 8 is a logical block diagram of one generalized beacon device in accordance with various aspects of the present disclosure. The beacon device includes a processor subsystem, a memory subsystem, a network/data interface subsystem, and a bus to connect them.

In one embodiment, the beacon device may be a wireless access point. Other embodiments of beacon devices may include without limitation or server devices or any other device that may send out wireless signals.

In one embodiment, the processor subsystem may read instructions from the memory subsystem and execute them within one or more processors. The illustrated processor subsystem includes a central processing unit (CPU). In one specific implementation, the CPU controls device operation and/or performs tasks of arbitrary complexity/best-effort. CPU operations may include, without limitation: operating system (OS) functionality (power management, UX), memory management, etc. Other processor subsystem implementations may multiply, combine, further subdivide, augment, and/or subsume the foregoing functionalities within these or other processing elements. For example, co-processors and/or hardware accelerators may be used to accelerate media tasks (e.g., graphics processing, etc.).

In one embodiment, the memory subsystem may be used to store data locally at the beacon device. In one embodiment, data may be stored as non-transitory symbols (e.g., bits read from non-transitory computer-readable mediums). In one specific implementation, the memory subsystem is physically realized as one or more physical memory chips (e.g., NAND/NOR flash) that are logically separated into memory data structures.

In one embodiment, the network/data interface subsystem may be used to receive data from, and/or transmit data to, other devices. In some embodiments, data may be received/transmitted as transitory signals (e.g., electrical signaling over a transmission medium). In other embodiments, data may be received/transmitted as non-transitory symbols (e.g., bits read from non-transitory computer-readable mediums). The network/data interface subsystem may include: wired interfaces, wireless interfaces, and/or removable memory media. In one embodiment, the network/data interface subsystem may include network interfaces including, but not limited to: Wi-Fi, Bluetooth, Global Positioning System (GPS), USB, and/or Ethernet network interfaces.

In one embodiment, the program code includes non-transitory instructions that when executed by the processor subsystem cause the processor subsystem to perform tasks which may include: calculations, and/or actuation of the network/data interface subsystem. In some embodiments, the program code may be statically stored within the beacon device as firmware. In other embodiments, the program code may be dynamically stored (and changeable) via software updates. In some such variants, software may be subsequently updated by external parties and/or the user, based on various access permissions and procedures.

In one aspect, the beacon device may be configured to broadcast network information to devices in a venue. The broadcast information may include network details. The network details may allow a user device to connect to the wireless access point as a connection to a network (e.g., the internet). The broadcast information may be unique to the beacon device and useable by a user device to verify their presence at a location. The beacon device may vary the broadcast network details over time (e.g., daily, hourly) to protect against fraudulent verification.

In another aspect, the beacon device may be configured to broadcast steganographic data can also be used to compensate for limited network connectivity. For example, multiple beacon devices may be distributed throughout a venue to relay traffic and improve overall network connectivity. Additionally, however, the beacon devices may generate continuous authentication codes which are transmitted as steganographic audio codes; the superposition properties of audio waveforms will allow a user device recording audio to capture both the music and the steganographic information. In this manner, the user's presence may be verified using a proof-of-sound. Further the verification may occur at a later time (as the superposition of the music and steganographic codes proves concurrent recording at a time and place).

In a further aspect, the beacon device may be configured to provide a data exchange with a user device for verification. The beacon device may broadcast network details (as described above). The user device may form a network connection to the beacon device. The user device may send data to the beacon device (e.g., user identification information, device identifier, etc.). The beacon device may digitally sign the data with a time stamp. The digitally signed data may be verified by a third-party to determine that the user device was at the location for the drop. In some embodiments, the data is sent directly to a third-party verifier (e.g., a verification device). In this case, the user device may not need to independently verify with a separate verification device.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A non-transitory computer-readable medium comprising instructions which, when executed by a processor subsystem, causes a device to:

send an instruction to generate a non-fungible token (NFT) on a blockchain, the instruction indicating one or more conditions to receive the NFT;

play audio;

capture an audio portion associated with a drop timestamp; and send data associated with the audio portion and the drop timestamp to a verification server configured to verify users who meet the one or more conditions to receive the NFT at a time synchronized execution based on the drop timestamp.

2. The non-transitory computer-readable medium of claim 1, where the instructions, when executed by the processor subsystem, further causes the device to:

fingerprint the audio portion producing a digital fingerprint, where the data associated with the audio portion comprises the digital fingerprint.

3. The non-transitory computer-readable medium of claim 1, where the one or more conditions comprise a time and a location of an event.

4. The non-transitory computer-readable medium of claim 1, where the one or more conditions comprise a length or a quality of the audio portion.

5. The non-transitory computer-readable medium of claim 1, where the one or more conditions further comprise geographic or proximity data for at least one of a listener application or a creator application.

6. The non-transitory computer-readable medium of claim 1, where the one or more conditions further comprise proof-of-bump data that identifies a history of physical proximity to other user devices.

7. The non-transitory computer-readable medium of claim 1, where the one or more conditions further comprise proof-of-dance data that identifies a history of user motion.

8. The non-transitory computer-readable medium of claim 1, where the audio portion is limited to a frequency range.

9. The non-transitory computer-readable medium of claim 1, where the instructions further cause the device to record timestamped location data.

10. The non-transitory computer-readable medium of claim 1, where the instructions further cause the device to record timestamped proximity interaction data with at least one other user device.

11. The non-transitory computer-readable medium of claim 1, where the one or more conditions to receive the NFT are formalized in a smart contract.

12. The non-transitory computer-readable medium of claim 11, where the smart contract is a unilateral contract.

13. The non-transitory computer-readable medium of claim 11, where the smart contract is a bilateral contract.

14. The non-transitory computer-readable medium of claim 11, where the smart contract offers a unilateral contract for a standard NFT and a bilateral contract for a preferential NFT.

15. The non-transitory computer-readable medium of claim 11, where the data associated with the audio portion is scanned by the verification server for uniqueness.

16. The non-transitory computer-readable medium of claim 15, where the uniqueness is based on first ambient noise or first echoes for a first physical time and first place associated with a first user.

17. The non-transitory computer-readable medium of claim 16, where the uniqueness is additionally based on second ambient noise or second echoes for a second physical time and second place associated with a second user.

18. The non-transitory computer-readable medium of claim 1, where the audio portion includes chatter and ambient noise that differs from a corresponding portion of the audio.

19. The non-transitory computer-readable medium of claim 18, where the verification server is further configured to verify the audio portion based on the chatter and the ambient noise that differs from the corresponding portion of the audio.

20. The non-transitory computer-readable medium of claim 18, where the data associated with the audio portion comprises proof-of-sound.

* * * * *